(12) United States Patent
Zhang et al.

(10) Patent No.: US 11,570,458 B2
(45) Date of Patent: Jan. 31, 2023

(54) INDICATION OF TWO-STEP CROSS-COMPONENT PREDICTION MODE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 47 days.

(21) Appl. No.: 17/353,661

(22) Filed: Jun. 21, 2021

(65) Prior Publication Data

US 2021/0321131 A1 Oct. 14, 2021

Related U.S. Application Data

(63) Continuation of application No. PCT/CN2019/127379, filed on Dec. 23, 2019.

(30) Foreign Application Priority Data

Dec. 22, 2018 (WO) ............... PCT/CN2018/122955
Dec. 25, 2018 (WO) ............... PCT/CN2018/123394

(51) Int. Cl.
*H04N 19/186* (2014.01)
*H04N 19/593* (2014.01)
(Continued)

(52) U.S. Cl.
CPC .......... *H04N 19/50* (2014.11); *H04N 19/117* (2014.11); *H04N 19/157* (2014.11);
(Continued)

(58) Field of Classification Search
CPC .... H04N 19/11; H04N 19/119; H04N 19/124; H04N 19/129; H04N 19/157;
(Continued)

(56) References Cited

U.S. PATENT DOCUMENTS 9,294,769 B2 * 3/2016 Jeon ................. H04N 19/61
9,866,842 B2 * 1/2018 Kim ................. H04N 19/44
(Continued)

FOREIGN PATENT DOCUMENTS

CN 106464885 A 2/2017
CN 107079157 A 8/2017
(Continued)

OTHER PUBLICATIONS

Bross et al. ""Versatile Video Coding (Draft 3),"" Joint Video Experts Team (JVET) of ITU-T SG 16 WP 3 and ISO/IEC JTC 1/SC 29/WG 11 12th Meeting, Macao, CN, Oct. 3-12, 2018, document JVET-L1001, Oct. 2018. http://phenix.it-sudparis.eu/jvet/doc_end_user/documents/12_Macao/wg11/JVET-L1001-v10.zip.
(Continued)

*Primary Examiner* — Tsion B Owens
(74) *Attorney, Agent, or Firm* — Perkins Coie LLP

(57) ABSTRACT

A method for video bitstream processing includes generating a prediction block for a first video block of a video related to a first component, where the prediction block is selectively generated according to a criterion by applying a two-step cross-component prediction mode (TSCPM), and performing a conversion between the first video block and a
(Continued)

bitstream representation of the video using the prediction block, wherein a first field in the bitstream representation corresponds to the TSCPM.

20 Claims, 26 Drawing Sheets

(51) Int. Cl.
*H04N 19/50* (2014.01)
*H04N 19/117* (2014.01)
*H04N 19/176* (2014.01)
*H04N 19/184* (2014.01)
*H04N 19/157* (2014.01)

(52) U.S. Cl.
CPC ......... *H04N 19/176* (2014.11); *H04N 19/184* (2014.11); *H04N 19/186* (2014.11); *H04N 19/593* (2014.11)

(58) Field of Classification Search
CPC ........... H04N 19/593; H04N 19/00896; H04N 19/00072; H04N 19/176
See application file for complete search history.

(56) References Cited

U.S. PATENT DOCUMENTS

| | | | |
|---|---|---|---|
| 10,200,700 | B2 | 2/2019 | Zhang et al. |
| 10,419,757 | B2 | 9/2019 | Chen et al. |
| 10,469,847 | B2 | 11/2019 | Xiu et al. |
| 10,939,128 | B2 | 3/2021 | Zhang et al. |
| 10,979,717 | B2 | 4/2021 | Zhang et al. |
| 11,190,790 | B2 * | 11/2021 | Jang ................ H04N 19/105 |
| 2013/0136375 | A1 * | 5/2013 | Sasai ................ H04N 19/184 382/238 |
| 2013/0148722 | A1 | 6/2013 | Zhang et al. |
| 2013/0223522 | A1 * | 8/2013 | Song ................ H04N 19/182 375/240.03 |
| 2014/0098189 | A1 | 4/2014 | Deng et al. |
| 2014/0098869 | A1 | 4/2014 | Su et al. |
| 2014/0219336 | A1 * | 8/2014 | Jeon ................ H04N 19/182 375/240.02 |
| 2014/0314142 | A1 * | 10/2014 | Oh ................ H04N 19/129 375/240.02 |
| 2014/0328397 | A1 * | 11/2014 | Jeon ................ H04N 19/117 375/240.12 |
| 2014/0348236 | A1 * | 11/2014 | Kim ................ H04N 19/182 375/240.12 |
| 2015/0124876 | A1 * | 5/2015 | Lee ................ H04N 19/176 375/240.12 |
| 2016/0219283 | A1 | 7/2016 | Chen et al. |
| 2017/0244975 | A1 | 8/2017 | Huang et al. |
| 2018/0063527 | A1 | 3/2018 | Chen et al. |
| 2018/0084258 | A1 * | 3/2018 | Kim ................ H04N 19/186 |
| 2018/0205946 | A1 * | 7/2018 | Zhang ................ H04N 19/103 |
| 2019/0158851 | A1 * | 5/2019 | Kim ................ G06T 9/004 |
| 2020/0252619 | A1 | 8/2020 | Zhang et al. |
| 2020/0359051 | A1 | 11/2020 | Zhang et al. |
| 2020/0366896 | A1 | 11/2020 | Zhang et al. |
| 2020/0366910 | A1 | 11/2020 | Zhang et al. |
| 2020/0366933 | A1 | 11/2020 | Zhang et al. |
| 2020/0382769 | A1 | 12/2020 | Zhang et al. |
| 2020/0382800 | A1 | 12/2020 | Zhang et al. |
| 2021/0076028 | A1 * | 3/2021 | Heo ................ H04N 19/159 |
| 2021/0092395 | A1 | 3/2021 | Zhang et al. |
| 2021/0092396 | A1 | 3/2021 | Zhang et al. |
| 2022/0007012 | A1 * | 1/2022 | Srinivasan ............ H04N 19/33 |
| 2022/0038683 | A1 * | 2/2022 | Choi ................ H04N 19/436 |

FOREIGN PATENT DOCUMENTS

| | | |
|---|---|---|
| EP | 3203746 A1 | 8/2017 |
| TW | 201817236 A | 5/2018 |
| WO | 2017209328 A1 | 12/2017 |
| WO | 2018174617 A1 | 9/2018 |
| WO | 2018191224 A1 | 10/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Information Technology—High Efficiency Media Coding—Part 2 Video, GB/T 33475.2, Dec. 30, 2016. (with English equivalent).

Laroche et al. "CE3-5.1: On Cross-Component Linear Model Simplification," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0191, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Ma et al. "CE3: Multi-directional LM (MDLM) (Test 5.4.1 and 5.4.2)" Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0338, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

JEM-7.0: https://jvet.hhi.fraunhofer.de/svn/svn_HMJEMSoftware/tags/HM-16.6-JEM-7.0.

https://vcgit.hhi.fraunhofer.de/jvet/VVCSoftware_VTM/tags/VTM-3.0.

International Search Report and Written Opinion from International Patent Application No. PCT/CN2019/127377 dated Mar. 25, 2020 (10 pages).

International Search Report and Written Opinion from International Patent Application No. PCT/CN2019/127379 dated Mar. 23, 2020 (9 pages).

International Search Report and Written Opinion from International Patent Application No. PCT/CN2019/127380 dated Mar. 25, 2020 (11 pages).

* cited by examiner

INDICATION OF TWO-STEP CROSS-COMPONENT PREDICTION MODE

CROSS REFERENCE TO RELATED APPLICATIONS

This application is a continuation of International Patent Application No. PCT/CN2019/127379, filed on Dec. 23, 2019, which claims the priority to and benefits of International Patent Application No. PCT/CN2018/122955, filed on Dec. 22, 2018, PCT/CN2018/123394, filed on Dec. 25, 2018. All the aforementioned patent applications are hereby incorporated by reference in their entireties.

TECHNICAL FIELD

This document is related to video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used to perform inter-component prediction in image and/or video coding. A first example method of video processing comprises generating, using a first video block derived from a third video block of a first component and having a first size, a prediction block for a second video block of a video related to a second component, where the first component is different from the second component, and where the second video block has a second size that is different from the first size, and performing, using the prediction block, a conversion between the second video block and a bitstream representation of the video according to a two-step cross-component prediction mode (TSCPM).

A second example method of video processing comprises generating, using a first video block derived from a third video block of a first component and having a first size, a prediction block for a second video block of a video related to a second component, where the first component is different from the second component, and where the second video block has a second size that is different from the first size, and performing a conversion between the second video block and a bitstream representation of the video by using the prediction block and by aligning neighboring samples for a linear model parameter derivation technique in a cross-component linear model (CCLM) mode.

A third example method of video processing comprises generating, using a first video block derived from a third video block of a first component and having a first size, a prediction block for a second video block of a video related to a second component, where the first component is different from the second component, where the prediction block is generated using a prediction mode selected from a plurality of allowed prediction modes, and where the second video block has a second size that is different from the first size, and performing a conversion between the second video block and a bitstream representation of the video using the prediction block.

A fourth example method of video processing comprises generating a prediction block for a first video block of a video related to a first component, where the prediction block is selectively generated according to a criterion by applying a two-step cross-component prediction mode (TSCPM), and performing a conversion between the first video block and a bitstream representation of the video using the prediction block, wherein a first field in the bitstream representation corresponds to the TSCPM.

A fifth example method of video processing comprises generating a prediction block for a first video block of a video related to a first component, where the prediction block is selectively generated according to a criterion by applying a two-step cross-component prediction mode (TSCPM), where the criterion includes enabling or disabling the TSCPM or a cross component linear model (CCLM) mode for generating the prediction block, and where the criterion is based on a block dimension of a current block or slice or picture type, and performing a conversion between the first video block and a bitstream representation of the video using the prediction block, wherein a first field in the bitstream representation corresponds to the TSCPM.

A sixth method of video processing comprises generating, at least using a plurality of samples of a first video block, a prediction sample of one sample in a second video block related to a first component, where the prediction sample is generated by applying a multiple parameter model that the sample of the second video block is associated with, to the plurality of samples of the first video block, and performing a conversion between the second video block and a bitstream representation of the video using the prediction sample.

In another example aspect, the above-described methods may be implemented by a video decoder apparatus that comprises a processor.

In another example aspect, the above-described methods may be implemented by a video encoder apparatus comprising a processor for decoding encoded video during video encoding process.

In yet another example aspect, these methods may be embodied in the form of processor-executable instructions and stored on a non-transitory computer-readable program medium.

These, and other, aspects are further described in the present document.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to image/video coding technologies. Specifically, it is related to inter-component prediction in image/video coding. It may be applied to the existing video coding standard like HEVC, or the standard (Versatile Video Coding) to be finalized. It may be also applicable to future video coding standards or video codec.

2. Brief Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 3) could be found at: http://phenix.it-sudparis.eu/jvet/doc_end_user/documents/12_Macao/wg11/JVET-L1001-v10.zip. The latest reference software of VVC, named VTM, could be found at: https://vcgit.hhi.fraunhofer.de/jvet/VVCSoftware_VTM/tags/VTM-3.0

Figure 14:
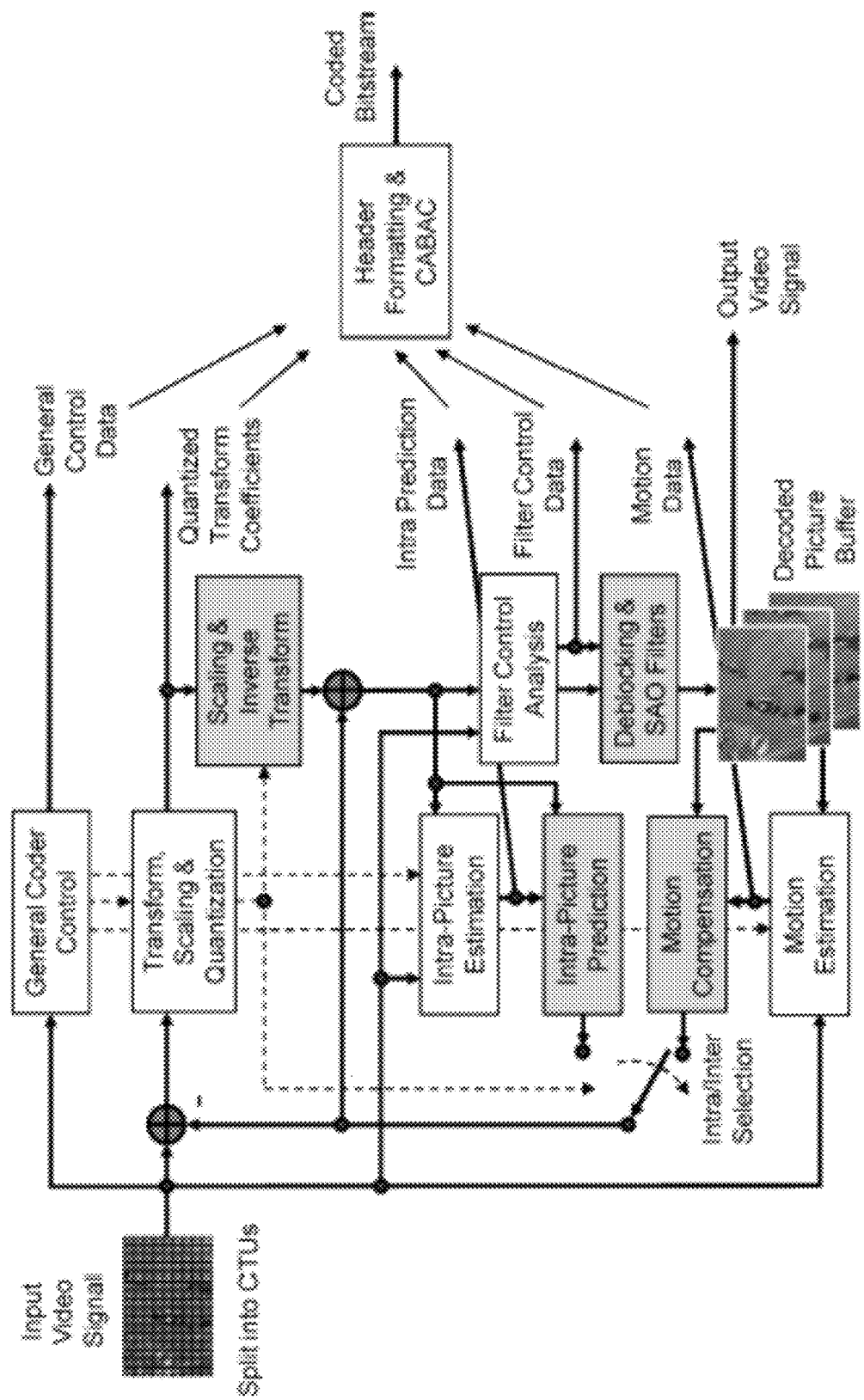
FIG. 14 shows a block diagram of an example implementation of a video encoder.

FIG. 14 is a block diagram of an example implementation of a video encoder.

2.1 Color Formats

Chroma subsampling is the practice of encoding images by implementing less resolution for chroma information than for luma information, taking advantage of the human visual system's lower acuity for color differences than for luminance.

4:2:0 is 2:1 subsampling of Horizontal and Vertical. A signal with chroma 4:4:4 has no compression (so it is not subsampled) and transports both luminance and color data entirely. In a four by two array of pixels, 4:2:2 has half the chroma of 4:4:4, and 4:2:0 has a quarter of the color information available.

Suppose one chroma block size is M×N wherein M is the width and N is the height of the chroma block, and the top-left position within the chroma block is denoted by (x, y). Then the collocated luma block could be identified by:

| Color format | top-left position of collocated luma block | Size of collocated luma block |
| --- | --- | --- |
| 4:4:4 | (x, y) | M × N |
| 4:2:0 | (2x, 2y) | 2M × 2N |
| 4:2:2 | (2x, y) | 2M × N |

2.2 Intra Prediction in HEVC/H.265

In picture two distinct kinds of redundancy can be identified: 1) Spatial or temporal redundancy, 2) Psycho-visual redundancy. For remove spatial redundancy, prediction process is used. Intra-prediction is the process to predict pixels of picture frame. Intra-picture prediction uses neighbourhood pixels for predict picture block. Before intra prediction frame must be split.

In HEVC, one picture/slice/tile may be split into multiple coding tree units (CTU). Depending on the parameters like texture complexity, the CTUs can have the size: 64×64, 32×32, or 16×16. Coding Tree Unit (CTU) is therefore a coding logical unit, which is in turn encoded into an HEVC bitstream. It consists of three blocks, namely luma (Y) two chroma components (Cb and Cr). Taking 4:2:0 color format as an example, Luma component have L×L samples and each chroma component have L/2×L/2 samples. Each block is called Coding Tree Block (CTB). Each CTB has the same size (L×L) as the CTU (64×64, 32×32, or 16×16). Each CTB can be divide repetitively in a quad-tree structure, from the same size as CTB to as small as 8×8. Each block resulting from this partitioning is called Coding Blocks (CBs) and becomes the decision making point of prediction type (inter or intra prediction). The prediction type along with other parameters is coded in Coding Unit (CU). So CU is the basic unit of prediction in HEVC, each of which is predicted from previously coded data. And the CU consists of three CBs (Y, Cb and Cr). CBs could still be too large to store motion vectors (inter-picture (temporal) prediction) or intra-picture (spatial) prediction mode. Therefore, Prediction Block (PB) was introduced. Each CB can be split into PBs differently depending on the temporal and/or spatial predictability. The CTUs can have the size: 32×32, 16×16, 8×8 or 4×4.

There are two kinds of intra prediction modes, PCM (pulse code modulation) and normal intra prediction mode.

2.2.1 PCM (Pulse Code Modulation)

In I_PCM mode, prediction, transform, quantization and entropy coding are bypassed. Coding of the samples of a block by directly representing the sample values without prediction or application of a transform.

In HEVC, I_PCM mode is only available for 2N×2N PU. Max and min I_PCM CU size is signalled in SPS, legal I_PCM CU sizes are 8×8, 16×16 and 32×32, user-selected PCM sample bit-depths, signalled in SPS for luma and chroma, separately.

Take Luma sample as an example: recSamplesL[i, j]=pcm_sample_luma[(nS*j)+i]<<(BitDepthY−PCMBitDepthY). It becomes lossless coding when PCMBitDepthY=BitDepthY 2.2.2 Normal Intra Prediction For the luma component, there are 35 modes, including Planar, DC and 33 angular prediction modes for all block sizes. To better code these luma prediction modes, one most probable mode (MPM) flag is firstly code to indicate whether one of the 3 MPM modes is chosen. If the MPM flag is false, then the 32 rest modes are coded with fixed length coding).

Figure 1:
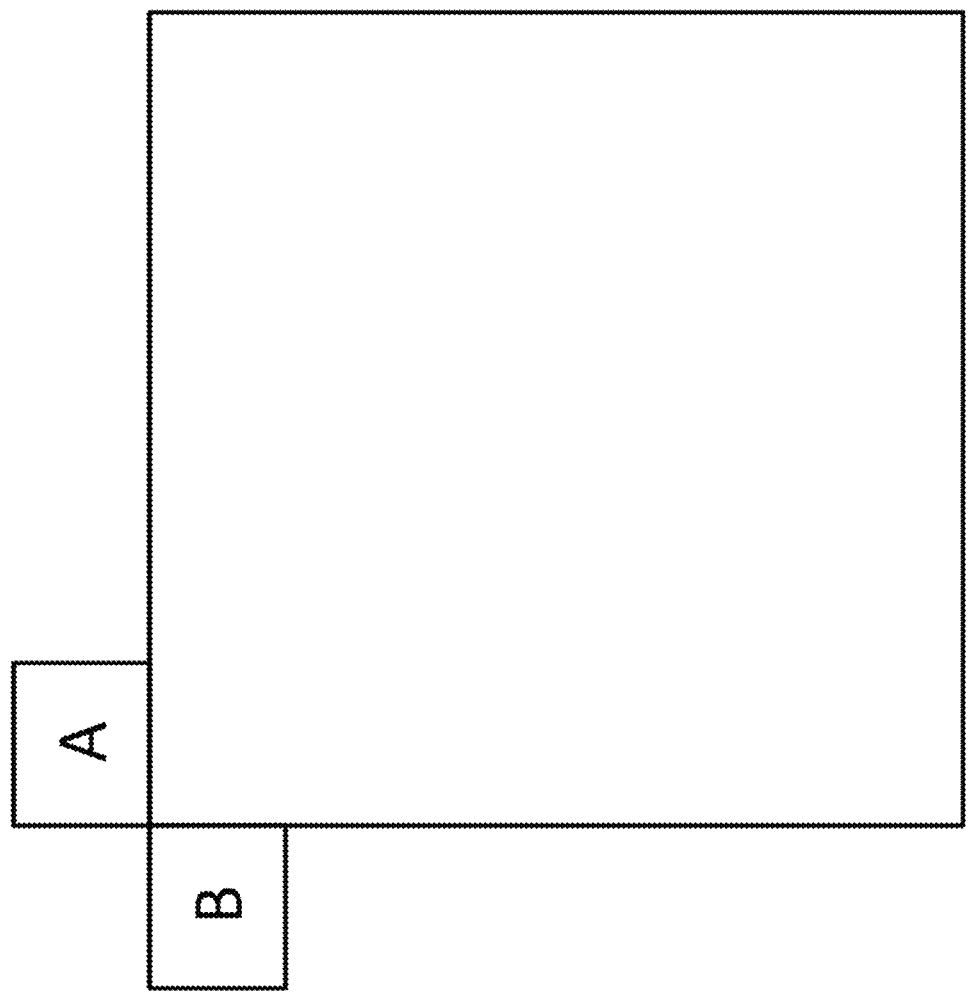
FIG. 1 shows an example of neighboring blocks used in intra mode prediction.

The selection of the set of three most probable modes is based on modes of two neighboring PUs, one left and one to the above of the current PU. Let the intra modes of left and above of the current PU be A and B, respectively wherein the two neighboring blocks are depicted in FIG. 1.

If a neighboring PU is not coded as intra or is coded with pulse code modulation (PCM) mode, the PU is considered to be a DC predicted one. In addition, B is assumed to be DC mode when the above neighboring PU is outside the CTU to avoid introduction of an additional line buffer for intra mode reconstruction.

If A is not equal to B, the first two most probable modes denoted as MPM[0] and MPM[1] are set equal to A and B, respectively, and the third most probable mode denoted as MPM[2] is determined as follows:

If neither of A or B is planar mode, MPM[2] is set to planar mode.

Otherwise, if neither of A or B is DC mode, MPM[2] is set to DC mode.

Otherwise (one of the two most probable modes is planar and the other is DC), MPM[2] is set equal to angular mode 26 (directly vertical).

If A is equal to B, the three most probable modes are determined as follows. In the case they are not angular modes (A and B are less than 2), the three most probable modes are set equal to planar mode, DC mode and angular mode 26, respectively. Otherwise (A and B are greater than or equal to 2), the first most probable mode MPM[0] is set equal to A and two remaining most probable modes MPM[1] and MPM[2] are set equal to the neighboring directions of A and calculated as:

$$MPM[1]=2+((A-2-1+32)\%32)$$

$$MPM[2]=2+((A-2+1)\%32)$$

where % denotes the modulo operator (i.e., a % b denotes the remainder of a divided by b).

For the chroma component, there are 5 modes, including DM, Planar, DC, Horizontal, Vertical.

2.3 Intra Prediction in VVC 2.3.1 Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
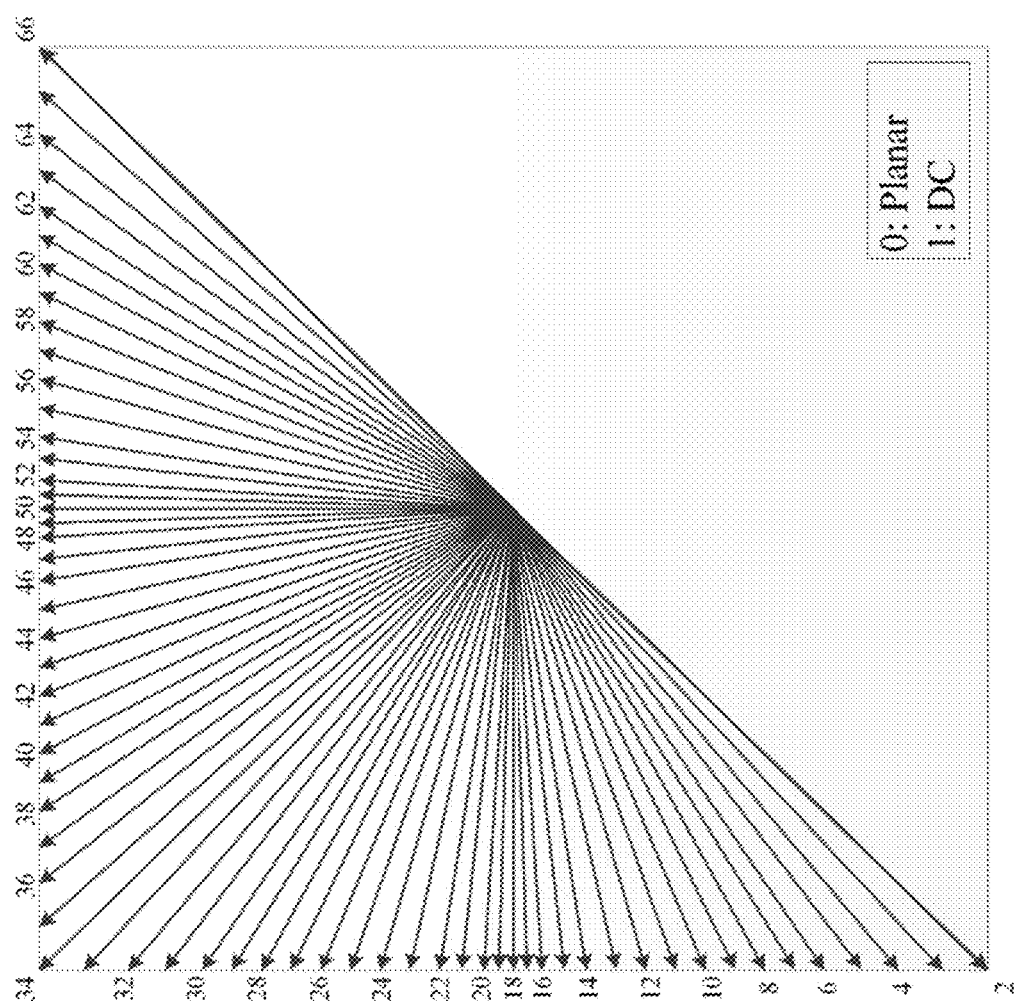
FIG. 2 shows an example of intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.3.2 Intra Mode Coding for Luma Component with 6 MPMs

Figure 3:
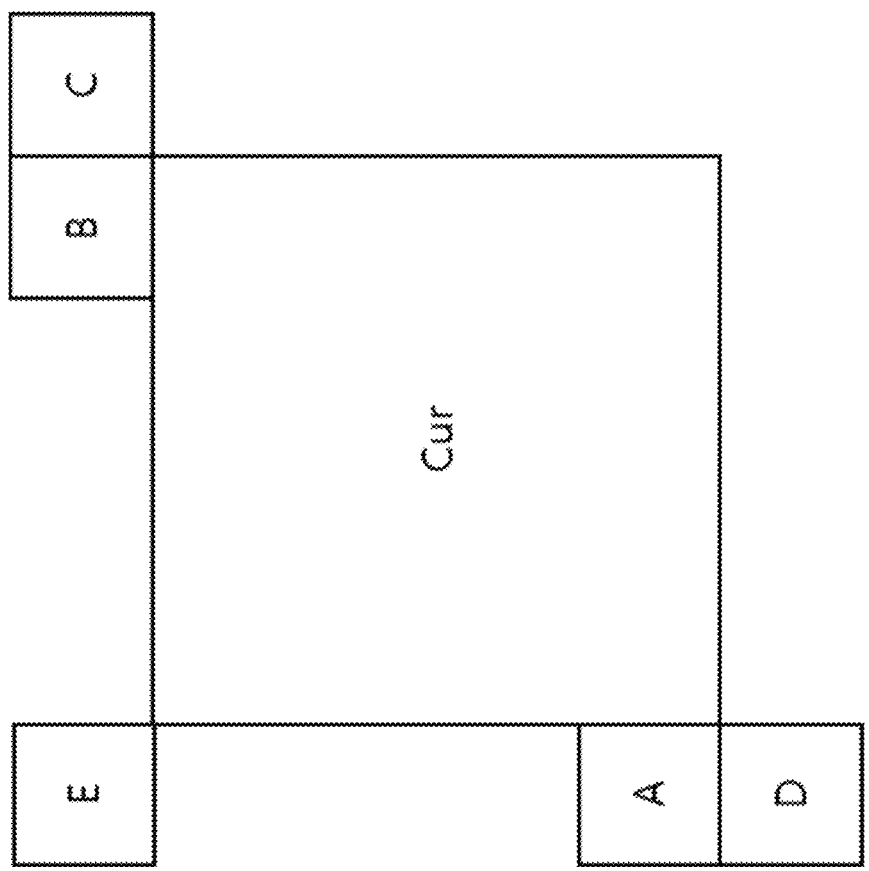
FIG. 3 shows an example of neighboring blocks used in a most probable mode (MPM) list construction process.

In VVC reference software VTM3.0.rc1, only intra mode of neighbor position A and B denoted as LEFT and ABOVE, as depicted in FIG. 3 are used for MPM list generation. For the non MPM coding, truncated binary coded is applied.

Let the intra modes of left and above of the current CU be $Mode_A$ and $Mode_B$, respectively.

If a neighboring CU is not coded as intra or is coded with pulse code modulation (PCM) mode, the CU is considered to be a Planar predicted one. In addition, $Mode_B$ is assumed to be Planar mode when the above neighboring CU is outside the CTU to avoid introduction of an additional line buffer for intra mode reconstruction.

The 6 MPM modes are denoted by MPM[i] (i being 0 . . . 5). The following steps are performed in order:

1. Initialized values: MPM[6]={ModeA, !ModeA, 50, 18, 46, 54};

2. If ModeA is equal to ModeB, the followings apply

If Mode$A$ is larger than 1 (non-DC/planar), MPM[6]
={Mode$A$,planar,DC,2+((candIntraPredModeA+
62)%65),2+((candIntraPredModeA−1)%65,2+
((candIntraPredModeA+61)%65))};

3. Otherwise (ModeA is equal to ModeB), the followings apply:

MPM[0]=Mode$A$, MPM[1]=Mode$B$

Set the variable biggerIdx is as follows:

biggerIdx=candModeList[0]>candModeList[1]?0:1

If both of ModeA and ModeB are larger than 1, MPM [x] with x=2 . . . 5 is derived as follows:

MPM[2]=INTRA_PLANAR

MPM[3]=INTRA_DC

If MPM[biggerIdx]−MPM[! biggerIdx] is equal to neither 64 nor 1, the following applies:

MPM[4]=2+((MPM[biggerIdx]+62)%65)

MPM[5]=2+((MPM[biggerIdx]−1)%65)

Otherwise, the following applies:

MPM[4]=2+((MPM[biggerIdx]+61)%65)

MPM[5]=2+(candModeList[biggerIdx]%65)

Otherwise, if sum of ModeA and ModeB is larger or equal to 2, the following applies:

MPM[2]=!MPM[!biggerIdx]

MPM[3]=2+((MPM[biggerIdx]+62)%65)

MPM[4]=2+((MPM[biggerIdx]−1)%65)

MPM[5]=2+((MPM[biggerIdx]+61)%65)

where % denotes the modulo operator (i.e., a % b denotes the remainder of a divided by b).

2.3.3 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 4:
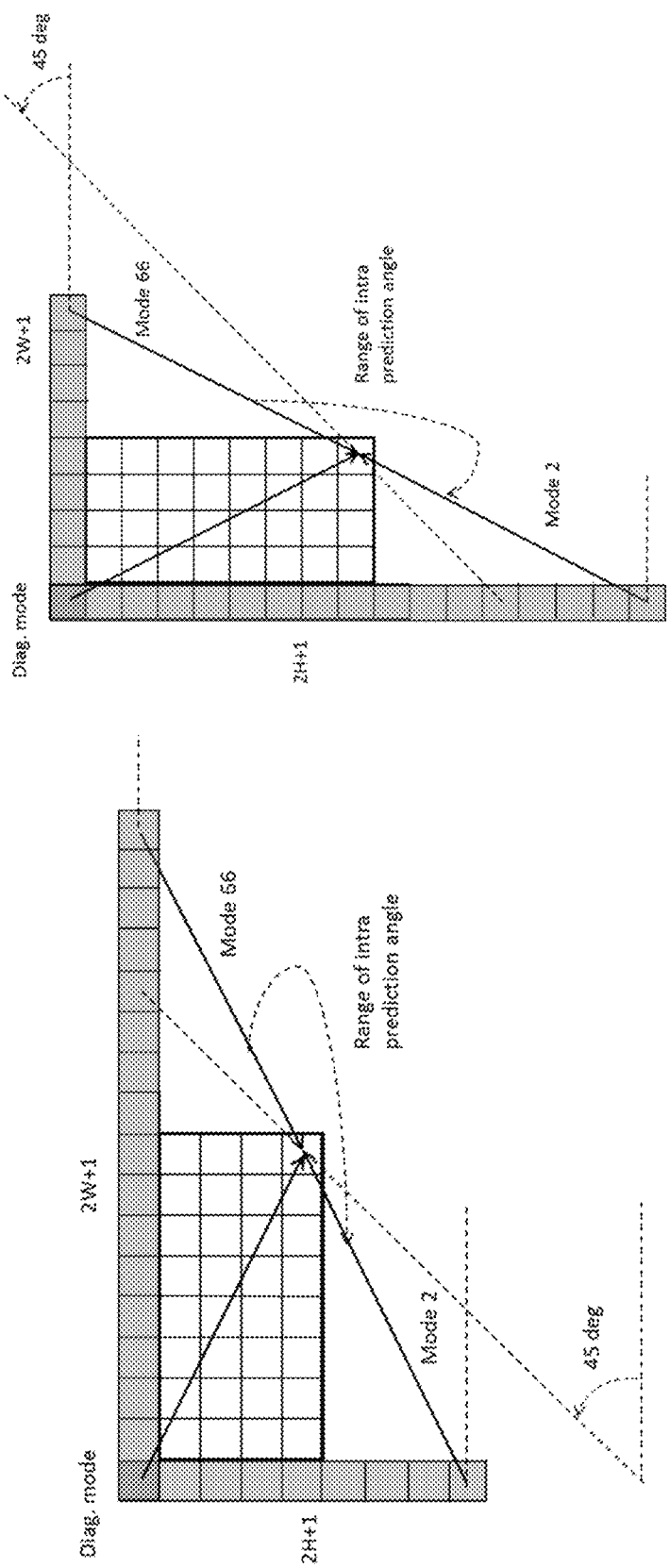
FIG. 4 shows an example of reference samples for wide-angular intra-prediction.

To support these prediction directions, the top reference with length 2 W+1, and the left reference with length 2H+1, are defined as shown in FIG. 4.

The mode number of replaced mode in wide-angular direction mode is dependent on the aspect ratio of a block. The replaced intra prediction modes are illustrated in Table 2-1.

TABLE 2-1

Intra prediction modes replaced by wide-angular modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 5:
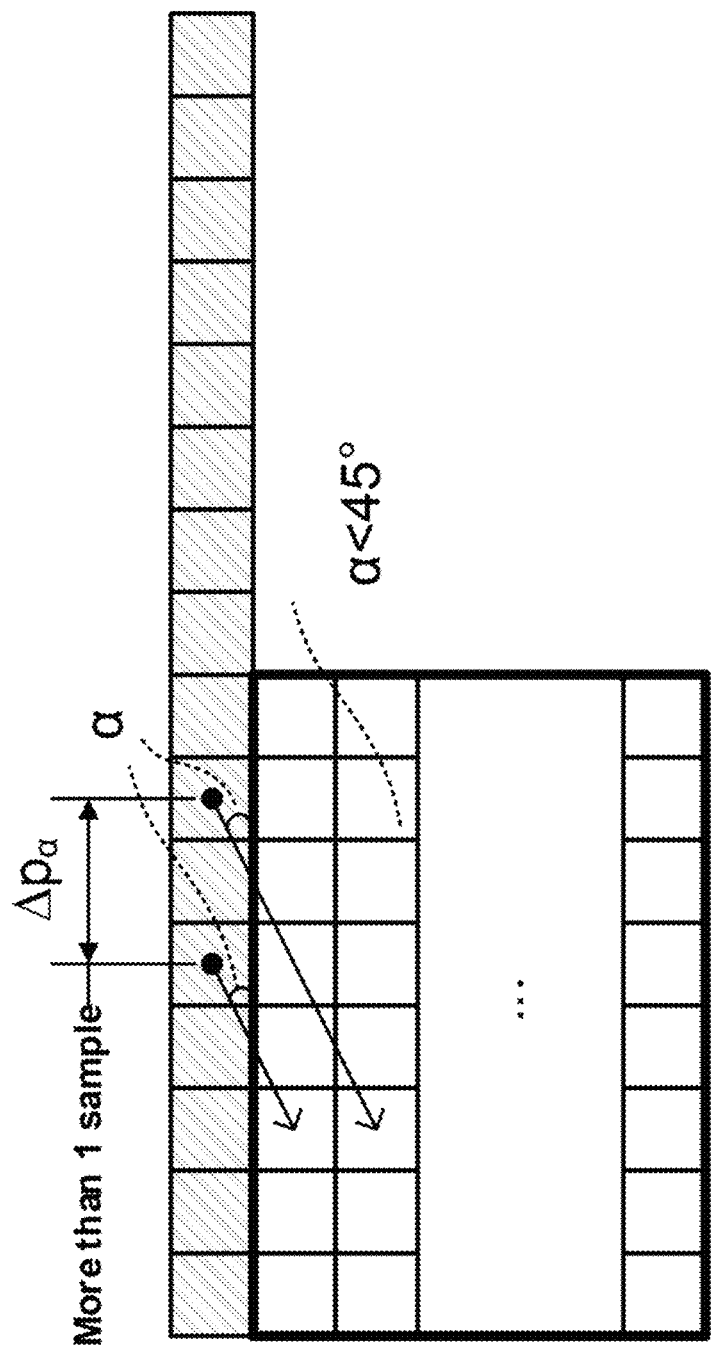
FIG. 5 shows an example of discontinuity for directions beyond 45 degrees.

As shown in FIG. 5, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.3.4 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\mathrm{pred}(x,y)=(wL\times R_{-1,y}+wT\times R_{x,-1}-wTL\times R_{-1,-1}+(64-wL-wT+wTL)\times\mathrm{pred}(x,y)+32)>>6$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

Figure 6:
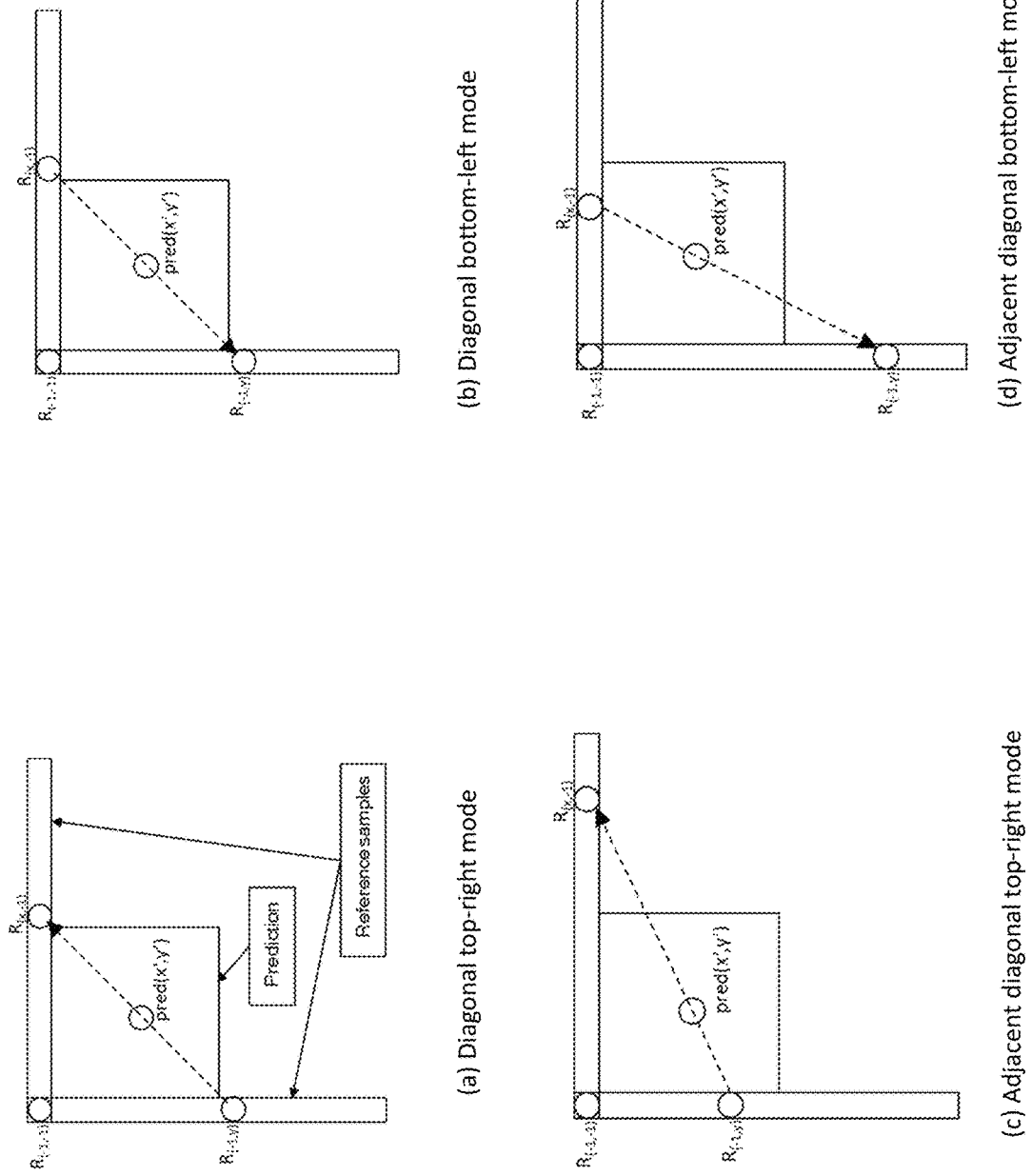
FIG. 6 shows an example of samples used by position dependent intra prediction combination (PDPC) applied to diagonal and adjacent angular intra modes.

FIG. 6 illustrates the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y' +1, and the coordinate y of the reference sample $R_{-1,y}$ is similarly given by: y=x'+y'+1.

The PDPC weights are dependent on prediction modes and are shown in Table 2-2.

TABLE 2-2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((y' << 1) >> shift) | 0 |

2.3.5 Multiple Reference Line Intra Prediction (MRLIP)

Instead of always using the reconstructed samples in the adjacent left column and above row (i.e., reference line 0) for intra prediction, it is proposed to allow using reference samples located at different distances.

Figure 7:
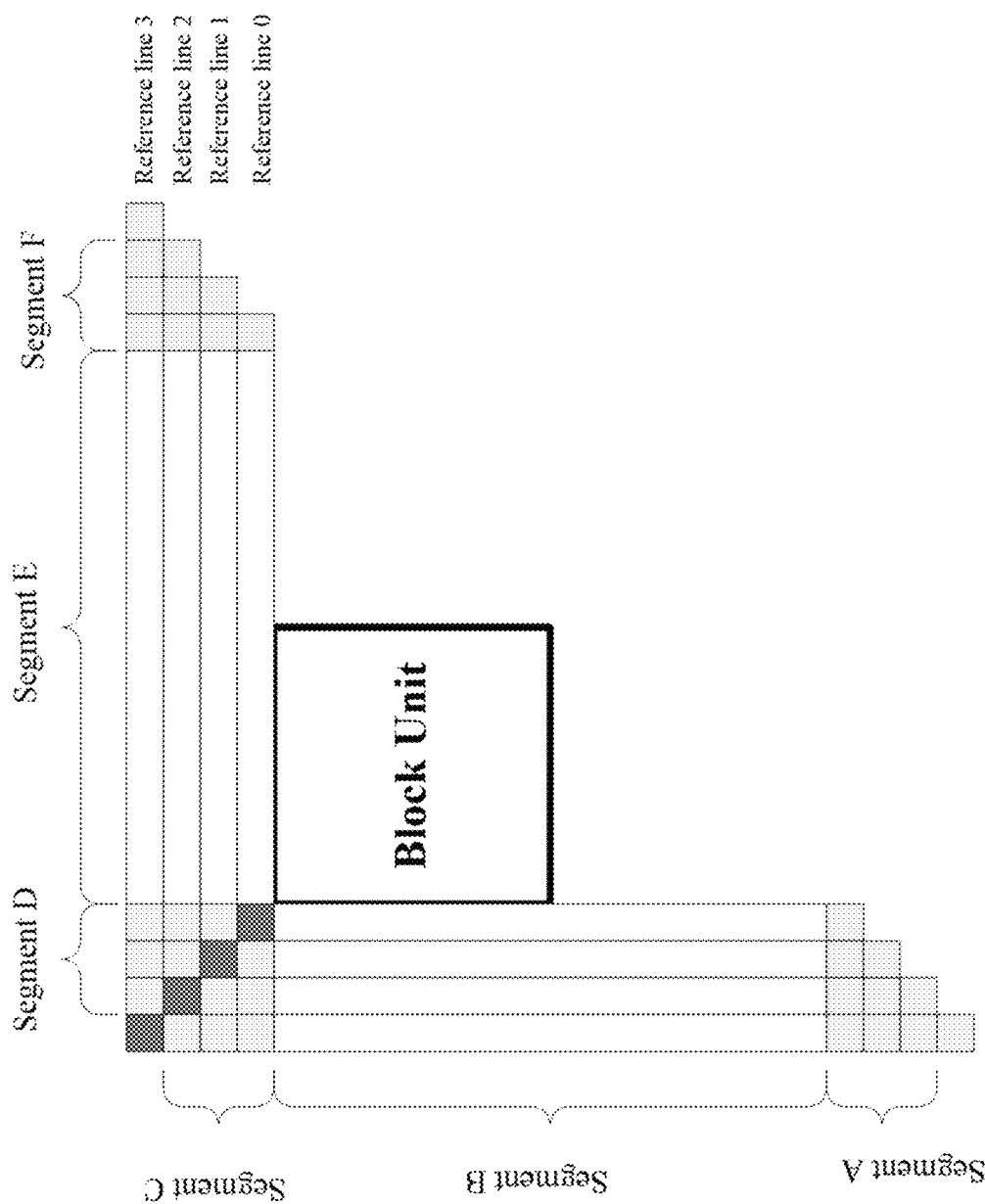
FIG. 7 shows an example of reference lines to be used for intra prediction.

The MRLIP has the following characteristics:

Reference line index signaling for reference line idx>0, only those in MPM list and only signal mpm index without remaining mode;

for reference line index=0, the same as original design, all kinds of intra prediction modes may be selected One of three lines may be selected for one luma block: reference line 0, 1, 3 as depicted in FIG. 7.

Top line of CTU restriction disable MRL for the first line of blocks inside a CTU 2.3.6 Chroma Coding In HEVC chroma coding, five modes (including one direct mode (DM) which is the intra prediction mode from the top-left corresponding luma block and four default modes) are allowed for a chroma block. The two color components share the same intra prediction mode.

Different from the design in HEVC, two new methods have been proposed, including: cross-component linear model (CCLM) prediction mode and multiple DMs.

CCLM o reduce the cross-component redundancy, a cross-component linear model (CCLM) prediction mode, a.k.a. LM, is used in the JEM, for which the chroma samples are predicted based on the reconstructed luma samples of the same CU by using a linear model as follows:

$$\text{pred}_C(i,j) = \alpha \cdot \text{rec}_L'(i,j) + \beta \quad (1)$$

where $\text{pred}_C(i,j)$ represents the predicted chroma samples in a CU and $\text{rec}_L'(i,j)$ represents the downsampled reconstructed luma samples of the same CU for color formats 4:2:0 or 4:2:2 while $\text{rec}_L'(i,j)$ represents the reconstructed luma samples of the same CU for color format 4:4:4. CCLM Parameters $\alpha$ and $\beta$ are derived by minimizing the regression error between the neighbouring reconstructed luma and chroma samples around the current block as follows:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (2)$$

$$\beta = \frac{\sum C(n) - \alpha \cdot \sum L(n)}{N} \quad (3)$$

where L(n) represents the down-sampled (for color formats 4:2:0 or 4:2:2) or original (for color format 4:4:4) top and left neighbouring reconstructed luma samples, C(n) represents the top and left neighbouring reconstructed chroma samples, and value of Nis equal to twice of the minimum of width and height of the current chroma coding block. For a coding block with a square shape, the above two equations are applied directly.

The CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

2.3.6.1.1 CCLM for Non-Square Block

Figure 8:
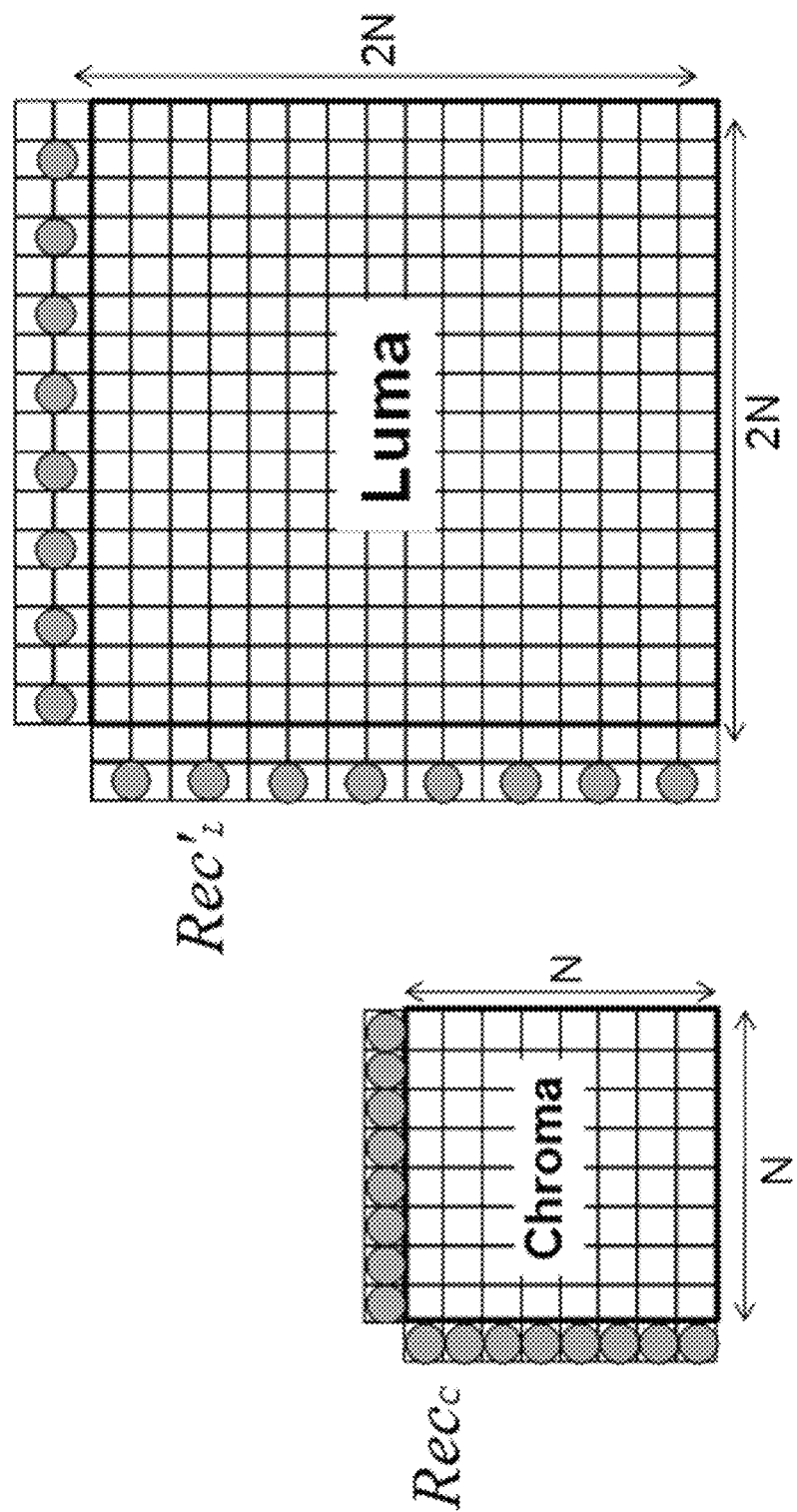
FIG. 8 shows an example of locations of samples used for derivation of $\alpha$ and $\beta$.

For a non-square coding block, the neighbouring samples of the longer boundary are first subsampled to have the same number of samples as for the shorter boundary. FIG. 8 shows the location of the left and above reconstructed samples and the sample of the current block involved in the CCLM mode.

This regression error minimization computation is performed as part of the decoding process, not just as an encoder search operation, so no syntax is used to convey the a and f3 values.

2.3.6.1.2 CCLM Between Chroma Components

The CCLM prediction mode also includes prediction between the two chroma components, i.e., the Cr component is predicted from the Cb component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$\text{pred}_{Cr}*(i,j) = \text{pred}_{Cr}(i,j) + \alpha \cdot \text{resi}_{Cb}'(i,j) \quad (4)$$

wherein $\text{resi}_{Cb}'(i,j)$ presents the reconstructed Cb residue sample at position (i,j).

The scaling factor $\alpha$ is derived in a similar way as in the CCLM luma-to-chroma prediction. The only difference is an addition of a regression cost relative to a default $\alpha$ value in the error function so that the derived scaling factor is biased towards a default value of −0.5 as follows:

$$\alpha = \frac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (5)$$

where Cb(n) represents the neighbouring reconstructed Cb samples, Cr(n) represents the neighbouring reconstructed Cr samples, and $\lambda$ is equal to $\Sigma(Cb(n) \cdot Cb(n)) >> 9$.

2.3.6.1.3 Downsampling Filters in CCLM Mode

Figure 9:
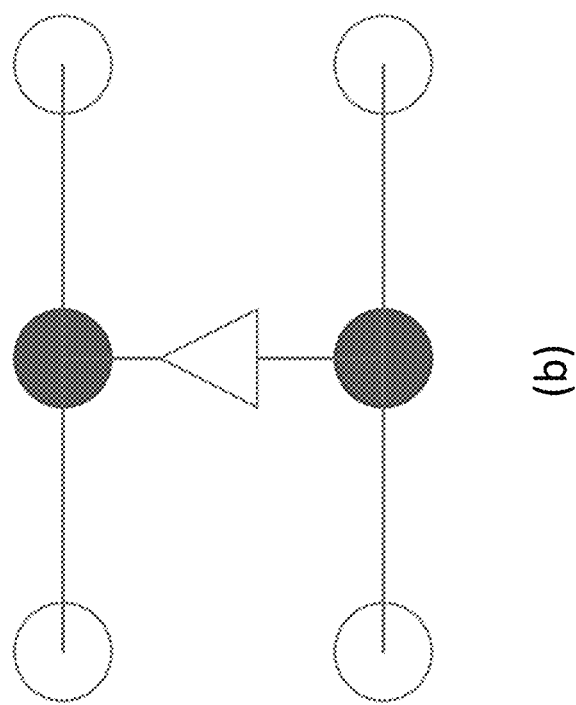
FIG. 9 shows an example for a chroma sample (the triangle) and a corresponding four luma samples (circles) for (a), and downsampling filtering for a cross-component linear model (CCLM)
Figure 9:
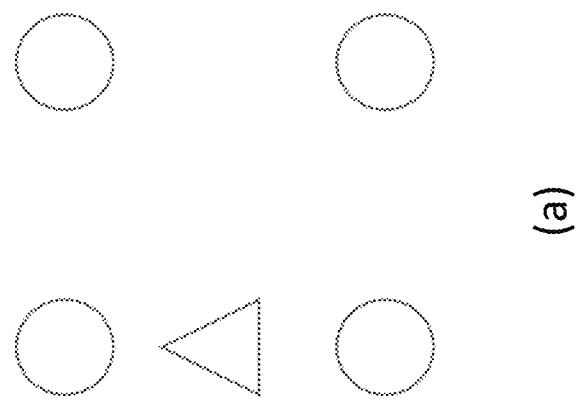

To perform cross-component prediction, for the 4:2:0 chroma format, where 4 luma samples corresponds to 1 chroma samples, the reconstructed luma block needs to be downsampled to match the size of the chroma signal. The default downsampling filter (e.g., 6-tap as depicted in FIG. 9 in (b)) used in CCLM mode is as follows.

$$\text{Rec}_L'[x,y] = \{2 \times \text{Rec}_L[2x,2y] + 2 \times \text{Rec}_L[2x, 2y+1] + \text{Rec}_L[2x-1,2y] + \text{Rec}_L[2x+1,2y] + \text{Rec}_L[2x-1,2y+1] + \text{Rec}_L[2x+1,2y+1] + 4\} >> 3 \quad (6)$$

Note that this downsampling assumes the "type 0" phase relationship as shown in (a) for the positions of the chroma samples relative to the positions of the luma samples—i.e., collocated sampling horizontally and interstitial sampling vertically.

2.3.6.2 MDLM in JVET-L0338

Figure 10:
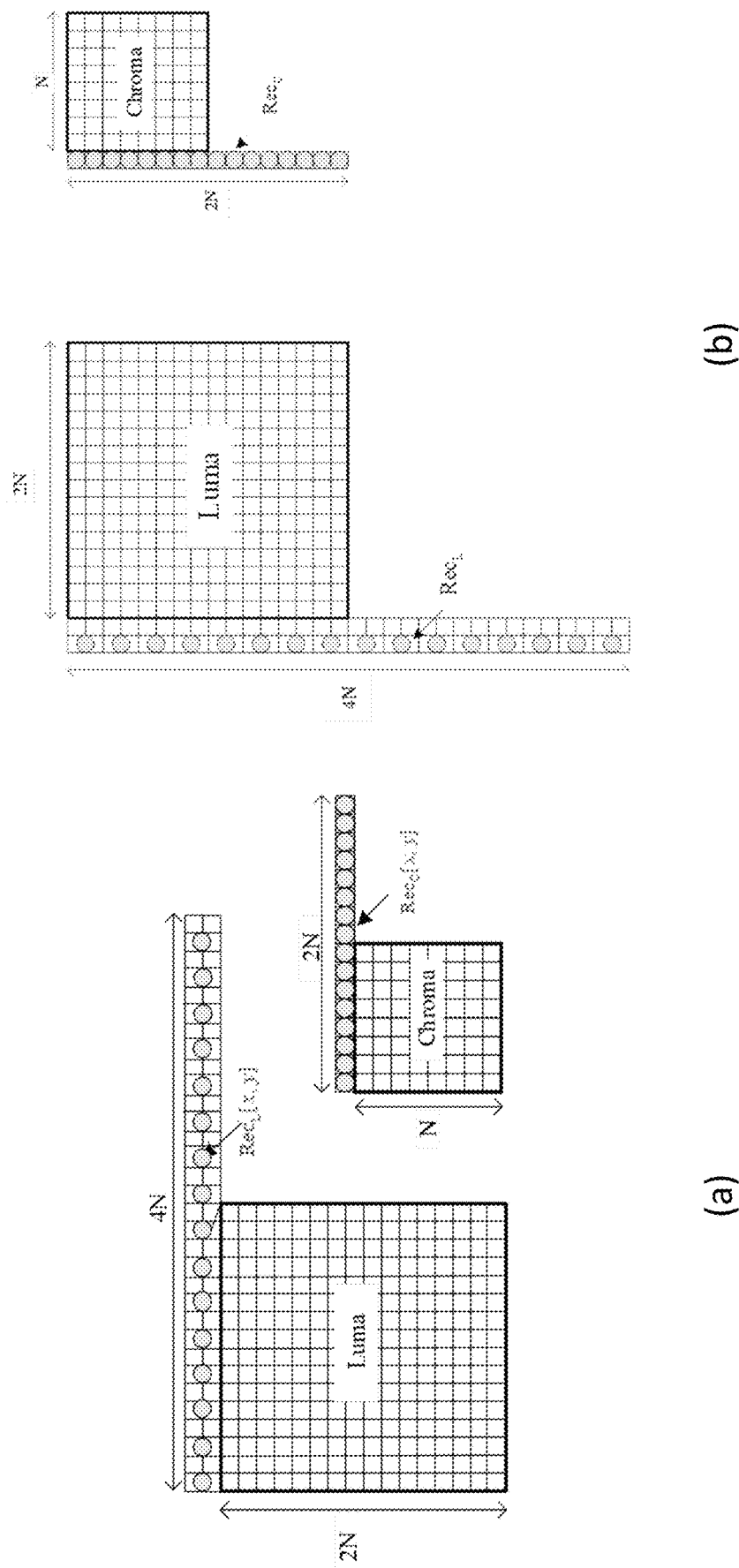
FIG. 10 shows an example for LM-A in (a) and LM-L in (b) for a chroma block size equal to N×N.

This contribution proposes multi-directional LM (MDLM). In MDLM, two additional CCLM modes are proposed: LM-A, where the linear model parameters are derived only based on the top neighboring samples as shown in FIG. 10 in (a), and LM-L, where the linear model parameters are derived only based on the left neighboring samples as shown in FIG. 10 in (b).

2.3.6.3 Two-Point Based CCLM in JVET-L0191

Figure 11:
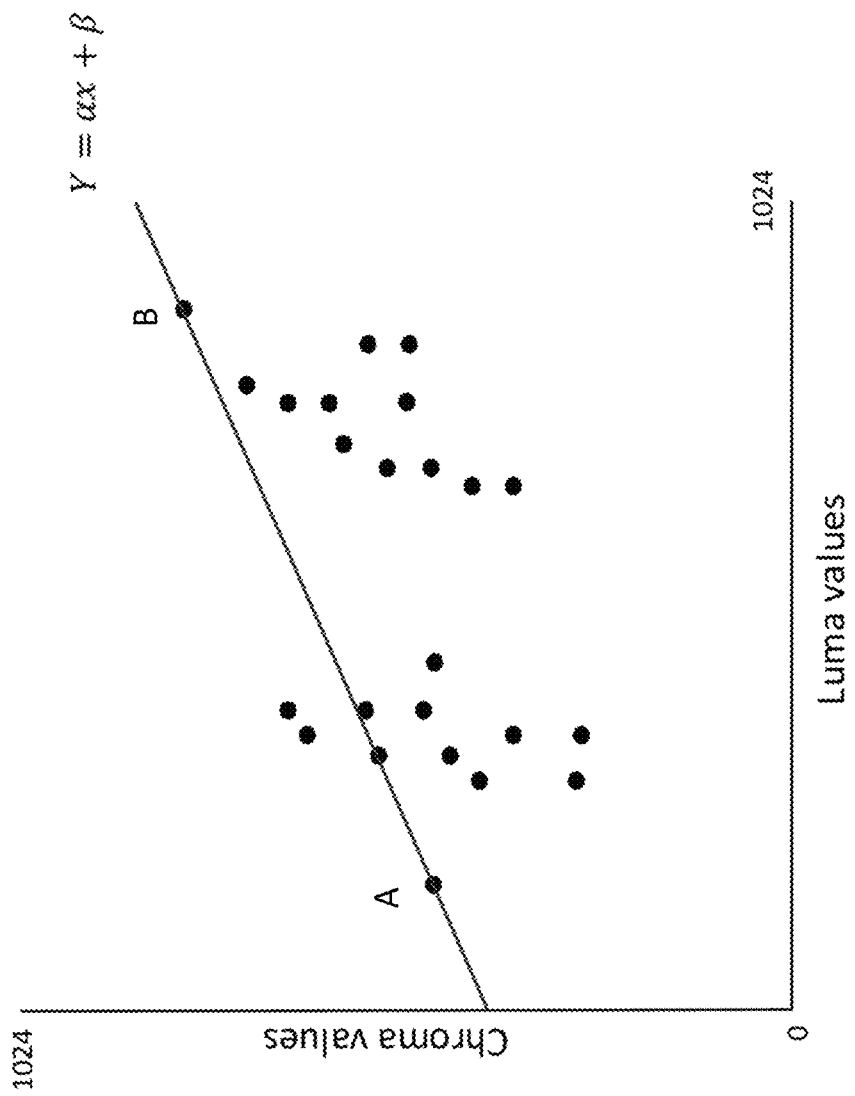
FIG. 11 shows an example of a straight line between minimum and maximum luma values.

JVET-L0191 proposes to replace the LMS algorithm of the linear model parameters $\alpha$ and $\beta$ by a straight line equation, so called two-point method. The 2 points (couple of Luma and Chroma) (A, B) are the minimum and maximum values inside the set of neighboring Luma samples as depicted in FIG. 11.

Where the linear model parameters $\alpha$ and $\beta$ are obtained according to the following equations: Where the linear model parameters $\alpha$ and $\beta$ are obtained according to the following equations:

$$\alpha = \frac{(y_B - y_A)}{(x_B - x_A)} \quad (7)$$

$$\beta = y_A - \alpha * x_A \quad (8)$$

The division to derive $\alpha$ is avoided and replaced multiplications and shifts as below:

If either above or left neighboring block is available, the following applies:

a=0;

iShift=16;

shift=(InternalBitDepth>8)?InternalBitDepth−9:0;

add=shift?1<<(shift−1):0;

diff=(MaxLuma−MinLuma+add)>>shift;

if (diff>0)

{ div=((MaxChroma−MinChroma)*g_aiLMDivTableLow[diff−1]+32768)>>16;

a=(((MaxChroma−MinChroma)*g_aiLMDivTableHigh[diff−1]+div+add)>>shift);

} b=Minchroma−((a*MinLuma)>>iShift);

Otherwise, the following applies:

a=0; iShift=0; b=1<<(BitDepthc−1)

wherein S is set equal to iShift, a is set equal to α and β is set equal to b; g_aiLMDivTableLow and g_aiLMDivTableHigh are two tables each with 512 entries. Each entry stores a 16-bit integer.

To derive the Chroma predictor, as for the current VTM implementation, the multiplication is replaced by an integer operation as the following:

$$pred_c(i, j)=(\alpha \cdot rec_L{'}^{(i,j)})>>S+\beta$$

The prediction values are further clipped to the allowed range of chroma values.

2.3.6.4 CCLM in VVC

CCLM from luma to chroma prediction as in JEM is adopted in VTM-2.0. In addition, JVET-L0338 and JVET-L0191 are further adopted into VTM-3.0.

In total, three modes for CCLM are supported, named INTRA_LT_CCLM (the one in JEM), INTRA_L_CCLM (LM-A) and INTRA_T_CCLM (LM-L). The differences among the three modes are which neighboring samples are utilized to derive the linear model parameters (i.e., α, β).

Suppose the chroma block size equal to nTbW×nTbH, the availability of top or left block of current block by availT and availL, respectively. The subsampling ratio of above row and left column by xS and yS, respectively.

2.3.6.4.1 INTRA_LT_CCLM

In this mode, the above row and left column may be utilized to derive linear model parameters. For non-square chroma block, the corresponding longer side may be sub-sampled. That is, up to 2*nS=2*(min(nTbW, nTbH)) samples may be utilized for linear model parameter derivation.

More specifically, the following applies:

$$nS=((availL\&\& availT)?Min(nTbW,nTbH): (availL?nTbH:nTbW)) \quad (9)$$

$$xS=1<<(((nTbW>nTbH)\&\&availL\&\& availT)?(Log 2(nTbW)-Log 2(nTbH)):0) \quad (10)$$

$$yS=1<<(((nTbH>nTbW)\&\&availL\&\&availT)?(Log 2(nTbH)-Log 2(nTbW)):0) \quad (11)$$

2.3.6.4.2 INTRA_L_CCLM

In this mode, the above row and above-right side (up to numSampL samples) are both utilized, if needed.

More specifically, the following applies:

xS and yS are set to 1 (i.e., no sub-sampling regardless it is non-square or square block).

$$numSampL= (availL\&\&predModeIntra==INTRA\_L\_CCLM)? (nTbH+numLeftBelow):0 \quad (12)$$

2.3.6.4.3 INTRA_T_CCLM

In this mode, the left column and left-below side (up to numSampT samples) are both utilized, if needed.

More specifically, the following applies:

xS and yS are set to 1 (i.e., no sub-sampling regardless it is non-square or square block).

$$numSampT=(availT\&\& predModeIntra==INTRA\_T\_CCLM)?(nTbW+ numTopRight):0 \quad (13)$$

2.3.6.4.4 Chroma prediction generation process

For all of the three supported LM modes, the followings apply:

The prediction samples predSamples[x][y] of one chroma block equal to with x=0 . . . nTbW−1, y=0 . . . nTbH−1 are derived as follows:

$$predSamples[x][y]=Clip1C(((pDsY[x][y]*a)>>k)+b) \quad (14)$$

$$Clip1c(x)=Clip3( 0, (1<<BitDepth_c)-1,x) \quad (15)$$

wherein (a, b), k (set to S) are the two linear model parameters derived from sub-sections 2.3.6.4.1, 2.3.6.4.2, or 2.3.6.4.3 depending on the selected CCLM mode for the chroma block, nTbW and nTbH are the width and height of the chroma block, respectively, and pDsY is the down-sampled collocated luma reconstructed block.

More specifically, the down-sampled collocated luma samples pDsY[x][y] with x=0 . . . nTbW−1, y=0 . . . nTbH−1 are derived as follows, with (1, 2, 1; 1, 2, 1) downasmpling filter or (1, 1) downsampling filter for the top-left position:

pDsY[x][y] with x=1 . . . nTbW−1, y=0 . . . nTbH−1 is derived as follows:

$$pDsY[x][y]=(pY[2*x-1][2*y]+pY[2*x-1][2*y+1]+ 2*pY[2*x][2*y]+2*pY[2*x][2*y+1]+pY[2*x+1] [2*y]+pY[2*x+1][2*y+1]+4)>>3 \quad (16)$$

If availL is equal to TRUE, pDsY[0][y] with y=0 . . . nTbH−1 is derived as follows:

$$PDsY[0][y]=(pY[-1][2*y]+pY[-1][2*y+1]+2*pY[0] [2*y]+2*pY[0][2*y+1]+pY[1][2*y]+PY[1][2*y]+ 4)>>3 \quad (17)$$

Otherwise, pDsY[0][y] with y=0 . . . nTbH−1 is derived as follows:

$$pDsY[0][y]=(pY[0][2*y]+pY[0][2*y+1]+1)>>1 \quad (18)$$

In above examples, pY indicates the collocated luma reconstructed samples before deblocking filter.

3. Examples of Problems Solved by Embodiments

In the current design of VVC, the CCLM design is mainly working for 4:2:0 color format.

The collocated luma 2M×2N block is firstly downsampled to M×N block and the chroma prediction block is generated by the M×N downsampled luma block which causes less efficient generated prediction block.

Different CCLM modes may utilize different neighboring samples which increase the logic complexity.

4. Examples of Embodiments

To solve the above mentioned problem, a two-step inter-component prediction (TSICP) method is proposed. The inter-component prediction may be defined as using the reconstructed samples of a collocated block for color component C0 to derive the prediction block of another block for color component C1. For example, for CCLM, C0 is defined as the luma component, C1 is defined to be one of the two chroma components.

Suppose a block size for one color component (C1) is denoted by M×N; and the top-left sample's coordinator denoted by (x, y) relative to the whole picture for the color component C1. The collocated block for another color component (C0) is denoted by M'×N' and the top-left sample's coordinator denoted by (x', y') relative to the whole picture for the color component C0.

The detailed techniques below should be considered as examples to explain general concepts. These techniques should not be interpreted in a narrow way. Furthermore, these techniques can be combined in any manner.

1. TSICP includes two steps wherein the first step uses the reconstructed collocated C0 block with size equal to (M'+W0)×(N'+H0) to derive a temporary C0 block with same size; and the second step is to use the temporary C0 block to derive a prediction block with size equal to M×N and use the prediction block to construct the C1 block with size equal to M×N.
   a. In one example, either M' unequal to M or N' unequal to N should be satisfied.
   b. In one example, W0 and/or H0 may be both equal to 0. Alternatively, W0 and/or H0 may be set to 1. In one example, W0 and H0 may be selected from {−2, −1, 0, 1, 2}.
      i. W0 and H0 may depend on color formats such as 4:2:0 or 4:2:2.
   c. Alternatively, values of W0 and/H0 may depend on whether the left and/or above block of the collocated C0 block is available (e.g., has been reconstructed and/or in the same CTU row and/or in the same slice/tile and/or in the same CTU).
      i. In one example, if the left block is available and the above block is not available, W0 is set to 1 and H0 is set to 0.
      ii. In one example, if the left block is not available and above is not available, W0 is set to 0 and H0 is set to 0.
   d. In one example, C0 is defined as luma component, C1 is defined as one of the two chroma component. Alternatively, C0 is defined as the main color component (e.g., G) and C1 is defined as dependent color component (e.g., B, or R color component).
   e. For each sample $S(x_0, y_0)$ located at $(x'+x_0, y'+y_0)$ of the reconstructed collocated C0 block, the corresponding sample $S_{Temp}(x_0, y_0)$ in the temporary C0 block is derived as the linear function of $S(x_0, y_0)$. $x_0$ is within the range $[0, M'-1]$ and $y_0$ is within the range $[0, N'-1]$.
      i. In one example, $S_{Temp}(x_0, y_0)$ is defined as $S(x_0, y_0)*a$.
      ii. In one example, $S_{Temp}(x_0, y_0)$ is defined as $(S(x_0, y_0)*a)>>k$.
      iii. In one example, $S_{Temp}(x_0, y_0)$ is defined as $((S(x_0, y_0)*a)>>k)+b$.
      iv. In one example, parameters a, k, b may be defined as the linear model parameters used in CCLM mode.
      v. Alternatively, furthermore, $S_{Temp}(x_0, y_0)$ may be clipped.
      vi. Alternatively, one sample in the temporary C0 block may be derived from multiple samples in the reconstructed C0 block.
      vii. Alternatively, the generation of the temporary C0 block may depend on at least one non-linear function of the reconstructed C0 block.
   f. In one example, downsampling filters (e.g., [1 2 1; 1 2 1] or [1 1]) may be applied to generate the C1 prediction block with size equal to M×N from the temporary C0 block.
      i. In one example, multiple downsampling filters may be utilized.
      ii. In one example, downsampling filters may be pre-defined or signalled in slice header/picture header/PPS/SPS/VPS/tile group header/CTU rows/groups of CTUs.
      iii. In one example, how to select a downsampling filter may depend on the relative position of a sample.
      iv. In one example, how to select a downsampling filter may depend on slice/tile/picture type.
      v. In one example, how to select a downsampling filter may depend on whether the required samples are available or not.
      vi. In one example, for a sample located at (0, 0) relative to the temporary C0 block, it may select either [1 1] or [1 2 1; 1 2 1].
      vii. In one example, for a sample not located at (0, 0) relative to the temporary C0 block, it may use 6-tap filter, such as [1 2 1; 1 2 1].
      viii. In one example, the prediction sample of the chroma block may only depend on K of the L corresponding luma reconstruction samples (K is an integer value).
      ix. In one example, the prediction sample of the chroma block may only depend on sample located at $(2*x, 2*y)$.
      x. In one example, the prediction sample of the chroma block may only depend on sample located at $(2*x+1, 2*y)$.
      xi. In one example, the prediction sample of the chroma block may only depend on sample located at $(2*x+1, 2*y+1)$.
      xii. In one example, the prediction sample of the chroma block may only depend on sample located at $(2*x, 2*y+1)$.
      xiii. In one example, the prediction sample of the chroma block may only depend on samples located at $(2*x, 2*y)$ and $(2*x, 2*y+1)$.
      xiv. In one example, selection of the downsampling filters may be decided jointly with the derivation of the linear model parameters. For example, for each candidate downsampling filter, the linear model parameters are derived, and the corresponding distortion is calculated. Finally, the downsampling filter and the linear model parameters that achieve the best minimum distortion is used.
      xv. Whether and how to apply the downsampling filter may depend on color formats such as 4:2:0 or 4:2:2.
   g. In one example, upsampling filters may be applied to generate the C1 prediction block with size equal to M×N from the temporary C0 block if either M is larger than M' or N is larger than N'.
   h. Clipping may be further applied to the C1 prediction block before being used to reconstruct the C1 block.
2. Linear model parameters (e.g., a, b, k mentioned above) may be derived in the same way as that used in VTM3.0/JEM or international patent application PCT/CN2018/119709, incorporated herein by reference.

a. Alternatively, linear model parameters may be derived from the neighboring reconstructed C0 samples without downsampling.
b. Alternatively, linear model parameters may be derived from the neighboring reconstructed C1 samples with upsampling.
c. Alternatively, furthermore, the linear model parameters may be firstly clipped to a range before being used either in TSICP or CCLM mode.
3. Multiple TSICP modes may be allowed with different linear model parameter derivation methods and/or different downsampling/up sampling methods and/or different locations of reconstructed/downsampled reconstructed neighbouring samples for linear model derivation.
   a. In one example, one mode is defined that may only utilize neighboring samples from above row and/or right above row.
   b. In one example, one mode is defined that may only utilize neighboring samples from left column and/or left below column.
   c. In one example, one mode is defined that multiple linear models (e.g., multiple sets of linear models) may be derived and applied to one block
      i. In one example, the current luma reconstruction blocks and/or neighbouring reconstructed samples may be split to M (M>1) categories. Different category may utilize different linear model.
   d. In one example, one mode is defined that the downsampling filter is defined to be subsampling filter. Assume a chroma sample to be predicted is located at (x, y), the L corresponding luma reconstruction samples are defined as the samples located at (2*x−1, 2*y), (2*x−1, 2*y+1), (2*x, 2*y), (2*x, 2*y+1), (2*x+1, 2*y) and (2*x+1, 2*y+1).
      i. In one example, K samples nearest the position (a, b) may be used. The variable (a, b) may depend on the color format. In one example, a=2*x and b=2*y for 4:2:0 color format.
      ii. In one example, the prediction sample of the chroma block may only depend on K of the L corresponding luma reconstruction samples (K is an integer value).
      iii. In one example, the prediction sample of the chroma block may only depend on sample located at (2*x, 2*y).
      iv. In one example, the prediction sample of the chroma block may only depend on sample located at (2*x+1, 2*y).
      v. In one example, the prediction sample of the chroma block may only depend on sample located at (2*x+1, 2*y+1).
      vi. In one example, the prediction sample of the chroma block may only depend on sample located at (2*x, 2*y+1).
      vii. In one example, the prediction sample of the chroma block may only depend on samples located at (2*x, 2*y) and (2*x, 2*y+1).
4. One flag may be signalled to indicate the usage of TSICP.
   a. In one example, a first bin may be coded to indicate the usage of DM mode, followed by a bin coded to indicate the usage of TSICP mode, if needed.
   b. Alternatively, a first bin may be coded to indicate the usage of TSICP mode, followed by a bin coded to indicate the usage of DM mode.
   c. In one example, the order of signalling DM or TSICP mode (DM before or after TSICP) may depend on the coded mode information of a spatial block.
      i. In one example, if the neighboring block is coded with TSICP mode, the indication of TSICP mode may be signalled before the indication of DM mode.
      ii. Alternatively, if the neighboring block is coded with DM mode, the indication of DM mode may be signalled before the indication of TSICP mode.
      iii. Alternatively, if the neighboring block is coded with non-TSICP mode (e.g., DM mode or other chroma intra prediction mode unequal to TSICP), the indication of DM mode may be signalled before the indication of TSICP mode.
   d. In one example, the shortest codeword is assigned to the indication of DM mode; and the second shortest codeword is assigned to the indication of TSICP mode;
   e. Alternatively, the shortest codeword is assigned to the indication of TSICP mode; and the second shortest codeword is assigned to the indication of DM mode;
   f. In one example, the flag/bin to indicate the usage of TSICP mode may be bypass coded, i.e., without any context.
   g. Alternatively, the flag/bin to indicate the usage of TSICP mode may be context coded, e.g., with one context.
   h. Alternatively, the flag/bin to indicate the usage of TSICP mode may be context coded, e.g., with multiple contexts.
      i. In one example, two contexts may be defined and the selection of one context is dependent on whether TSICP mode is enabled for a spatial neighboring block (e.g., the left/top/top-right/top-left/bottom-left).
      ii. In one example, the selected context index or context index offset is defined as:
         block A is available and TSICP mode is enabled for block A? 1:0
         Or
         block A is available and TSICP mode is enabled for block A? 0:1
         Or
         block A is unavailable or TSICP mode is enabled for block A? 1:0
         Or
         block A is unavailable or TSICP mode is enabled for block A? 0:1
      iii. In one example, three contexts may be defined and the selection of one context is dependent on whether TSICP mode is enabled for two spatial neighboring blocks.
      iv. In one example, the selected context index or context index offset is defined as:
         block A is available and TSICP mode is enabled for block A? 1:0
         +
         block B is available and TSICP mode is enabled for block B? 1:0
         Or
         block A is available and TSICP mode is enabled for block A? 0:1
         +
         block B is available and TSICP mode is enabled for block B? 0:1

Or
block A is unavailable or TSICP mode is enabled for block A? 1:0
+
block B is unavailable and TSICP mode is enabled for block B? 1:0
Or
block A is unavailable or TSICP mode is enabled for block A? 0:1
+
block B is unavailable and TSICP mode is enabled for block B? 0:1 i. In one example, when any of neighboring block which is utilized for context selection of TSICP flag/bin is outside the current CTU/current CTU row/a given region/the current slice/tile, it is marked as unavailable.
  i. Alternatively, such a neighboring block is treated as being coded with TSICP mode.
j. In one example, when multiple modes (e.g., described in bullet 4) are defined, the following coding methods of indications of usage of one mode may be utilized:
  i. In one example, one flag to indicate whether TSICP is utilized. If so, a further indication of one of the multiple TSICP modes within all TSICP modes may be signalled.
  ii. Alternatively, each TSICP mode is treated as a new mode which may be assigned with a given index.
  iii. The shortest codeword is assigned to the DM mode, followed by the flag to indicate whether TSICP is utilized.
  iv. Alternatively, the shortest codeword is assigned to the flag to indicate whether TSICP is utilized.
  v. In one example, all TSICP modes are given shorter codewords compared to the other intra chroma modes (e.g., DM or non-DM).
  vi. In one example, all TSICP modes are given shorter codewords compared to the intra chroma modes other than DM mode.
    a. In one example, the codeword for DM mode is shorter than all TSICP modes.
  vii. In one example, three TSICP modes are allowed. And the binarization of all intra chroma modes may be defined as follows. TSICP_Mode0 indicates the TSICP mode using both left and above neighboring samples to derive linear model parameters; TSICP_Mode1 and TSICP_Mode2 indicate the TSICP mode using only left and only above neighboring samples to derive linear model parameters, respectively.

TABLE 4-1 examples of chroma modes signalling methods.

| Mode index | Mode | Bin string |
|---|---|---|
| 0 | DM | 0 |
| 5 | TSICP_Mode0 | 10 |
| 6 | TSICP_Mode1 | 1110 |
| 7 | TSICP_Mode2 | 1111 |
| 1 | DC | 11000 |
| 2 | HOR | 11001 |
| 3 | VER | 11010 |
| 4 | BI | 11011 | viii. Some examples are given in the table 4-2 (a) and (b), respectively.

| Mode | Bin String |
|---|---|
| DM | 1 |
| TSICP | 01 |
| Non-DM mode 0 | 001 |
| Non-DM mode 1 | 0001 |
| Non-DM mode 2 | 00001 |
| ... | |
| Non-DM mode (K-1) | 00000 |

If TSICP is used, then the following further may apply (truncated unary or unary or fixed length coding):

| Mode | Bin String |
|---|---|
| TSICP Mode0 | 1 |
| TSICP Mode1 | 01 |
| TSICP Mode2 | 001 |
| ... | |
| TSICP Mode (M-1) | 00 . . . 000 |

(a) TSICP is firstly signalled, followed by indications of detailed TSICP modes. (different binarization and/or order of the modes may be applied)

| Mode | Bin String |
|---|---|
| DM | 1 |
| TSICP Mode 0 | 01 |
| TSICP Mode 1 | 001 |
| ... | |
| TSICP Mode (M-1) | 000 . . . 1 (there are M 0s) |
| Non-DM mode 0 | 0000 . . . 1 |
| Non-DM mode 1 | 00000 . . . 1 |
| ... | |
| Non-DM mode (K-1) | 000000 . . . 1 |

(b) Each TSICP mode is directly coded (different binarization and/or order may be applied).

Table 4-2: examples of chroma modes signalling methods.

5. It is proposed to align the neighboring samples to be utilized for linear model parameter derivation process in all CCLM modes.
  a. In one example, for all of them, sub-sampling methods are removed. That is, for INTRA_LT_CCLM, even it is non-square block, all the available neighboring samples may be utilized instead of applying sub-sampling to the longer side.
  b. In one example, for all of them, sub-sampling methods is utilized. That is, for INTRA_L_CCLM or INTRA_T_CCLM, if one chroma block is a non-square block, sub-sampling may be applied to the longer side.
  c. In one example, the same above and/or above-right samples may be utilized for INTRA_LT_CCLM and INTRA_T_CCLM.
  d. In one example, the same left and/or below-left samples may be utilized for INTRA_LT_CCLM and INTRA_L_CCLM.

Figure 12:
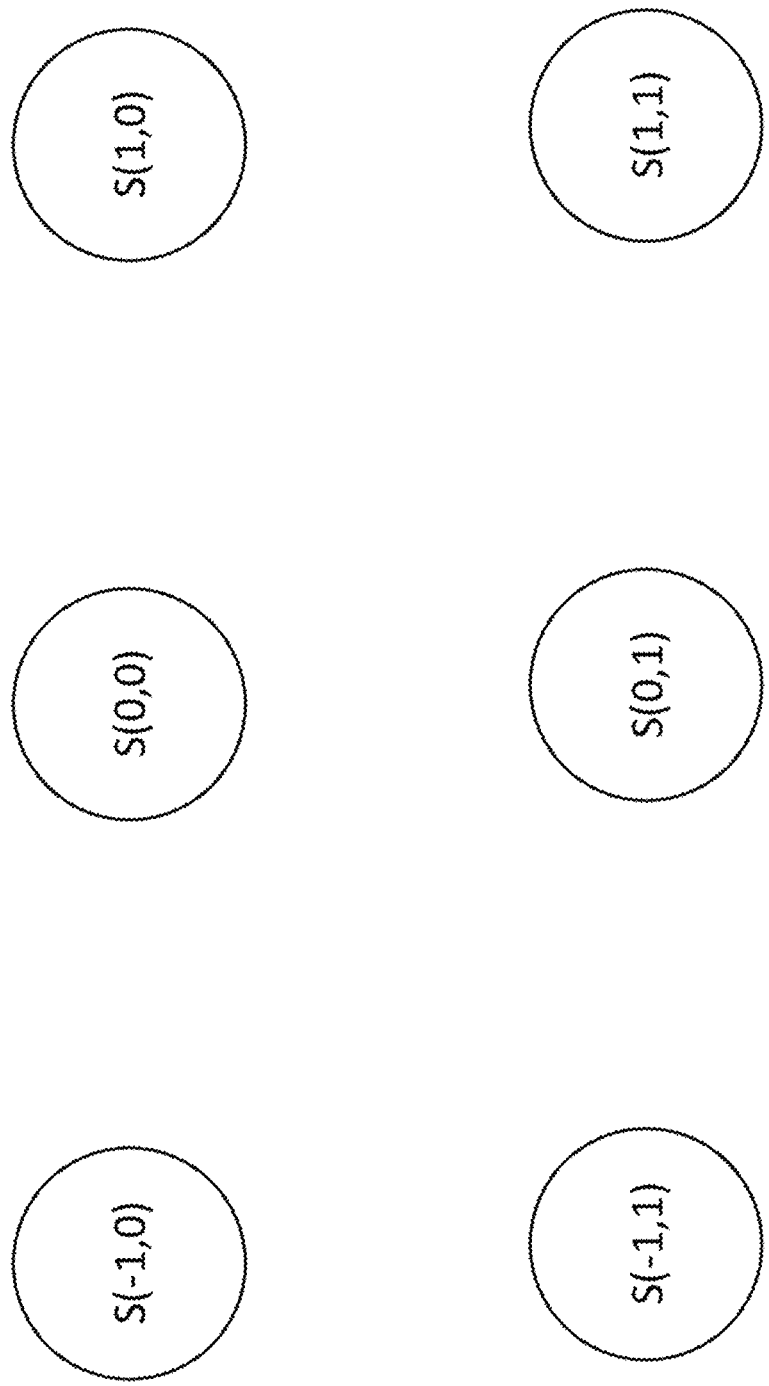
FIG. 12 shows an example of samples of one color component for derivation of prediction values at (0,0).

6. It is proposed that the downsampling filter may be decided at encoder and signaled to the decoder in SPS/VPS/PPS/slice header/tile header/CTU/CU etc.
7. It is proposed that the prediction block of one color component may be generated with an interpolation of linear function of reconstructed samples for another color component.
   a. In one example, the linear function may be defined in a similar way as TSICP.
   b. Alternatively, other kinds of functions (e.g., non-linear) may be applied to the reconstructed samples for another color component.
8. It is proposed to use a multiple-parameter model to derive inter-component prediction blocks. Assume that one C1 sample ($S^0_{c1}$) is associated with multiple C0 samples (denoted by $S^0_{c0}, S^1_{c0}, \ldots, S^{L-1}_{c0}$), each C0 sample may be assigned with one weighting parameter $\alpha^i$. In this case, the prediction value of $S^0_{c1}$ may be depend on $\alpha^k * S^k_{c0}$. The variable a shown below is the same as the variable $\alpha$.
   a. In one example, suppose the $S^0_{c1}$ is a sample located at (x, y), the L samples are defined as the samples located at (2*x−1, 2*y), (2*x−1, 2*y+1), (2*x, 2*y), (2*x, 2*y+1), (2*x+1, 2*y) and (2*x+1, 2*y+1).
   b. In one example, suppose the $S^0_{c1}$ is a sample located at (x, y), the L samples are defined as the samples located at (2*x, 2*y), (2*x, 2*y+1).
   c. How many C0 samples associated with one C0 sample and the relative positions of those C0 samples may depend on the coordinate (x, y) of the C1 sample.
   d. How many C0 samples associated with one C0 sample and the relative positions of those C0 samples may depend on the availability of C0 samples.
   e. In one example, the prediction value of $S^0_{c1}$ may be defined as $\Sigma_{k=0}^{L-1} a^k * S^k_{c0}$, where $a^k$ is a weighting parameter.
   f. In one example, the prediction value of $S^0_{c1}$ may be defined as $(\Sigma_{k=0}^{L-1} a^k * S^k_{c0}) >> M$ wherein variable M is an integer, where $a^k$ is a weighting parameter.
       i. Alternatively, the prediction value of $S^0_{c1}$ may be defined as $Clip3((\Sigma_{k=0}^{L-1} a^k * S^k_{c0}) >> M)$, where the operation Clip3 clips the prediction value within a valid range, where $a^k$ is a weighting parameter. As an example, a valid range for an 8-bit prediction value may include 0 to 255.
   g. In one example, the prediction value of $S^0_{c1}$ may be defined as $((\Sigma_{k=0}^{L-1} a^k * S^k_{c0}) >> M) + b$ wherein variable b is an integer, where $a^k$ is a weighting parameter.
       i. Alternatively, the prediction value of $S^0_{c1}$ may be defined as $Clip3(((\Sigma_{k=0}^{L-1} a^k * S^k_{c0}) >> M) + b)$, where the operation Clip3 clips the prediction value within a valid range, where $a^k$ is a weighting parameter. As an example, a valid range for an 8-bit prediction value may include 0 to 255.
   h. In one example, the prediction value of $S^0_{c1}$ may be defined as $\Sigma_{k=0}^{L-1} (a^k * S^k_{c0} + b^k)$ wherein variable b is an integer, where $a^k$ is a weighting parameter.
       i. Alternatively, the prediction value of $S^0_{c1}$ may be defined as $Clip3(\Sigma_{k=0}^{L-1} (a^k * s^k_{c0} + b^k))$, where the operation Clip3 clips the prediction value within a valid range, where $a^k$ is a weighting parameter. As an example, a valid range for an 8-bit prediction value may include 0 to 255.
   i. In one example, the prediction value of $S^0_{c1}$ may be defined as $\Sigma_{k=0}^{L-1} (((a^k * s^k_{c0}) >> M^k) + b^k)$ wherein variable b is an integer, where $a^k$ is a weighting parameter.
       i. Alternatively, the prediction value of $S^0_{c1}$ may be defined as $Clip3(\Sigma_{k=0}^{L-1} (((a^k * s^k_{c0}) >> M^k) + b^k))$, where the operation Clip3 clips the prediction value within a valid range, where $a^k$ is a weighting parameter. As an example, a valid range for an 8-bit prediction value may include 0 to 255.
   j. There may be some predefined relationship between parameters. For example, $a^0, a^1, a^2, a^3, a^4$ and $a^5$ are applied on samples S(0,0), S(0,1), S(−1,0), S(−1,1), S(1, 0), and S(1, 1) as shown in FIG. 12, then it is predefined that $a^0 = a^1 = 2 \times a^2 = 2 \times a^3 = 2 \times a^4 = 2 \times a^5$, where a is a weighting parameter.
   k. There may be more than one predefined relationship between parameters. One of the predefine relationship may be selected. The selection may be derived by the decoder, or it may be signaled from the encoder to the decoder in VPS/SPS/PPS/slice header/tile group/tile/CTU row/CTU/CU/PU.
   l.
9. Indications of whether and/or how to use above mentioned methods may be signalled in SPS/VPS/PPS/picture header/slice header/tile group header/group of CTUs/CTU/other kinds of video data units.
10. Whether and/or how to use the above mentioned methods may depend on the block dimension, slice/picture type, etc. al.
    a. In one example, for chroma blocks with number of samples larger than (or equal to) M (e.g., M=4096, 1024), such methods are disallowed.
    b. In one example, for chroma blocks with width and/or height larger than (or equal to) M (e.g., M=64, 32), such methods are disallowed.
    c. In one example, for chroma blocks with width and/or height smaller than (or equal to) M (e.g., M=2, 4), such methods are disallowed.
    d. When the above method is disallowed, indications of usage of such methods may be skipped.
    e. Alternatively, a confirming bitstream can follow the rule that such methods can be disabled when certain conditions (e.g., depending on block dimension) are satisfied.

5. Embodiment Examples

Figure 18:
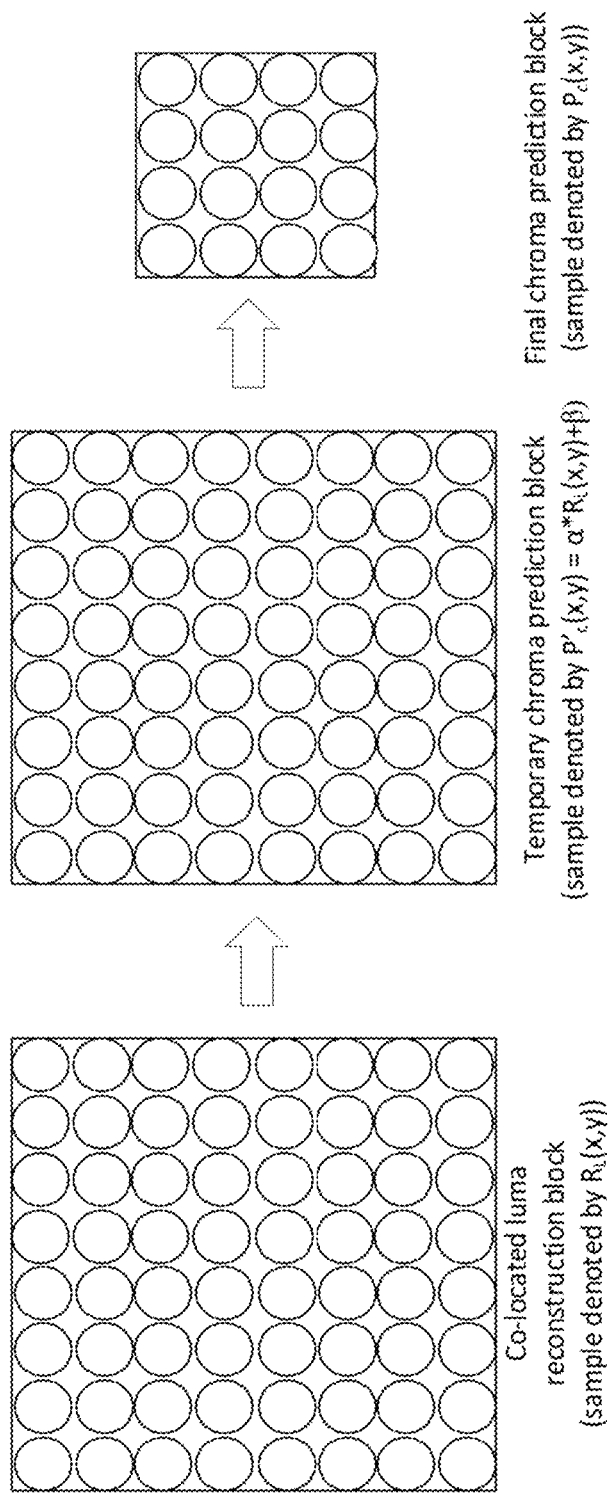
FIG. 18 shows coding flow of Two-Step Cross-component Prediction Mode (TSCPM) taking 4:2:0 and 8×8 luma block, 4×4 chroma block as an example.

This section shows an example of the proposed TSICP (a.k.a, Two-Step Cross-component Prediction Mode (TSCPM)) is done in the following steps:
Get linear model from neighboring reconstructed samples
Apply the linear model to the originally reconstructed luma block to get an internal prediction block.
The internal prediction block is down-sampled to generate the final chroma prediction block.
FIG. 18 depicts the basic procedures of the chroma prediction block generation process. The left square denotes the originally reconstructed luma sample located at (x, y) of the collocated luma block by RL(x, y). By simply applying the linear model with parameters $(\alpha, \beta)$ to each luma sample, a temporary chroma prediction block is generated. After that, the temporary chroma prediction block is further down-sampled to generate the final chroma prediction block.
The linear model derivation process and down-sampling process is described in the following sub-sections.

5.1 Derivation of Linear Model

In one embodiment, either 4 or 2 samples may be selected and averages of two larger values and two smaller values are utilized to calculate the parameters.

Selection of Neighboring Samples

Firstly, the ratio r of width and height is calculated as Eq.1. Then based on the availability of above row and left column, two samples are selected.

$$r = \begin{cases} \frac{width}{height} & \text{if width} \geq \text{height} \\ \frac{height}{width} & \text{if width} < \text{height} \end{cases} \quad (1)$$

The derivation of posA and posL is shown in Eq. 2 (The position index starts from 0).

$$posA = width - r$$

$$posL = height - 1 \quad (2)$$

Figure 19:
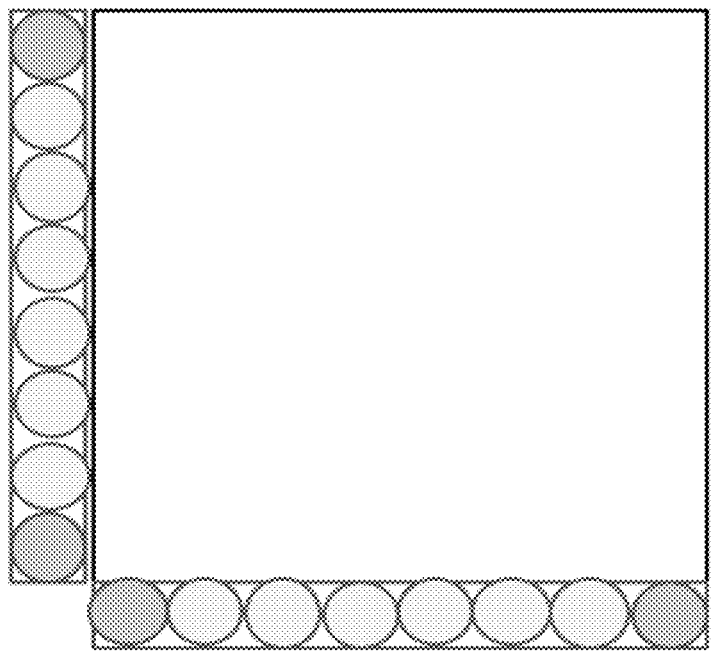
FIG. 19 shows examples of four neighboring samples, with both left and above reference samples available.

More specifically, if the above and the left blocks are both available, 4 samples locating at the first and posA of the first above line, the first and posL of the first left line are selected. FIG. 19 shows an example of deriving four neighboring samples. The selected samples are painted in yellow.

If only either the above block or left block is available, the four points located at i/4 (i being 0, . . . 3), if available, of the left line or above line are selected.

Subsequently, the 4 samples are sorted according to luma sample intensity and classified into 2 group. The two larger samples and two smaller samples are respectively averaged. Cross component prediction model is derived with the 2 averaged points. In one example, the similar way as described in Section 2.3.6.3 may be utilized to derive α, β and shift with the average of two larger selected sample values as (MaxLuma, MaxChroma) and the average of two smaller selected sample values as (MinLuma, MinChroma).

If only either the above block with current chroma block width to 2 or left block with current chroma block height to 2 is available, the first and the posA points of the above line or the first and the posL points of the left line are selected. A chroma prediction model is derived according to the luminance and chrominance values of selected 2 samples. In one example, the similar way as described in Section 2.3.6.3 may be utilized to derive α, β and shift.

If neither of the left and above blocks are available, a default prediction is used. with α equals 0, β equals to 1<<(BitDepth−1), where BitDepth represents the bit-depth of chroma samples.

5.2 Two Step Derivation Process of Chroma Prediction Block

The temporary chroma prediction block is generated with Eq (3). In Eq. 3, $P_c'(x, y)$ denotes a temporary prediction sample of chroma. α and β are two model parameters. $R_L(x, y)$ is a reconstructed luma sample.

$$P_c'(x, y) = \alpha \times R_L(x,y) + \beta \quad (3)$$

Similarly to for normal intra prediction process, clipping operations are applied to $P_c'(x, y)$ to make sure it is within [0, 1<<(BitDepth−1)].

A six-tap filter (i.e., [1 2 1; 1 2 1]) is introduced for the down-sampled process for temporary chroma prediction block, as shown in Eq.4.

$$P_c = (2 \times P_c'(2x, 2y) + 2 \times P_c'(2x, 2y+1) + P_c'(2x-1, 2y) + P_c'(2x+1, 2y) + P_c'(2x-1, 2y+1) + P_c'(2x+1, 2y-1) + \text{offset0}) >> 3 \quad (4)$$

In addition, for chroma samples located at the left most column, [1 1] downsampling filter if applied instead.

$$P_c = (P_c'(2x, 2y) + P_c'(2x+1, 2y) + \text{offset1}) >> 1$$

The two varaiables offset0 and offset1 are integer values. In some examples, the varaiables offset0 and offset1 may be set to 4, and 1, respectively. In some examples, offset0 and offset1 may be set to 0.

5.3 Syntax Design

Based on the TAVS3-2.3 platform, a flag is used to signal whether the chroma intra-predication mode is TSCPM or not. This flag is coded right after the DM mode. The detailed bin strings for each chroma mode is tabulated in the table below.

TABLE 3-1

Coding bins signaling with TSCPM of chroma intra modes in TAVS3-2.3.

| Index | Mode | Bin String |
|---|---|---|
| 0 | DM | 1 |
| 5 | TSCPM | 01 |
| 1 | DC | 001 |
| 2 | HOR | 0001 |
| 3 | VER | 00001 |
| 4 | BI | 00000 |

Figure 13:
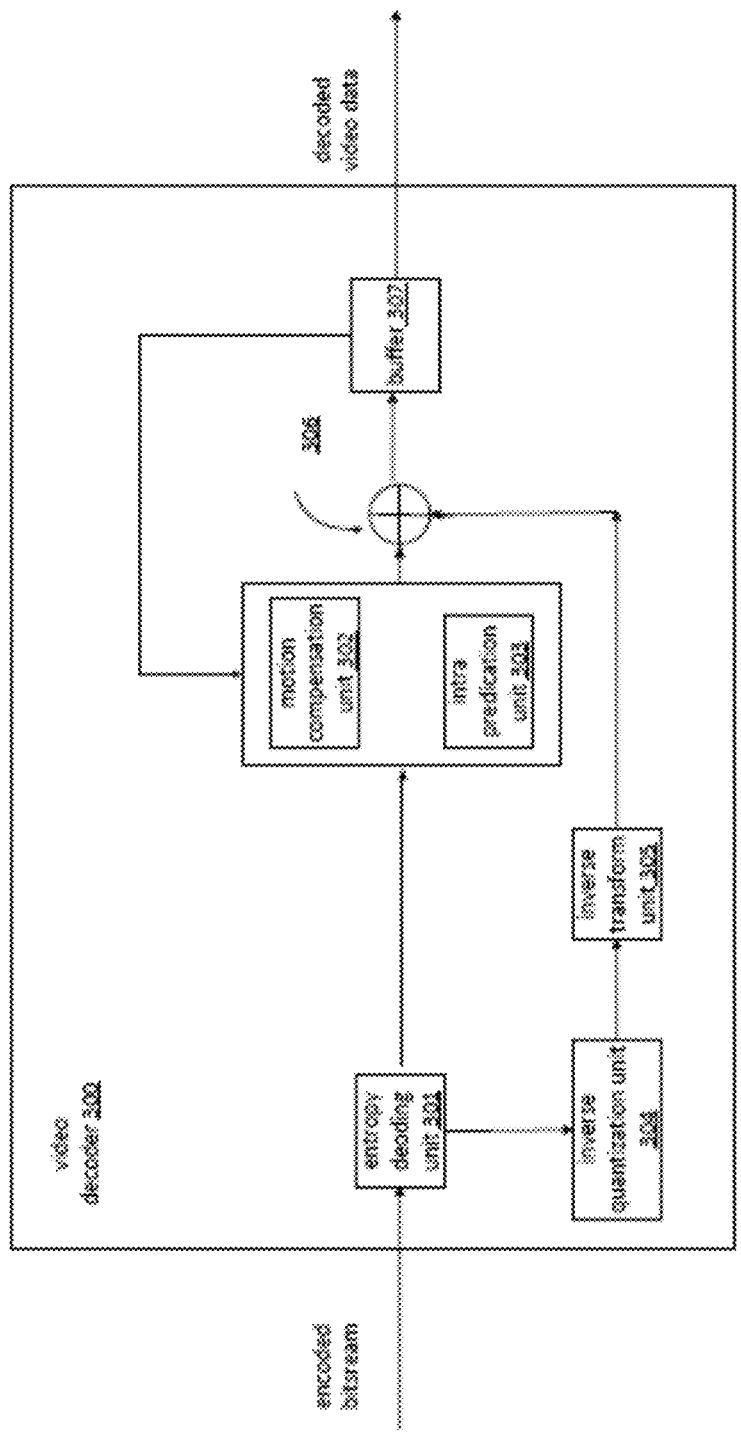
FIG. 13 is a block diagram that illustrates a decoder in accordance with some embodiments of the present disclosure.
Figure 22:
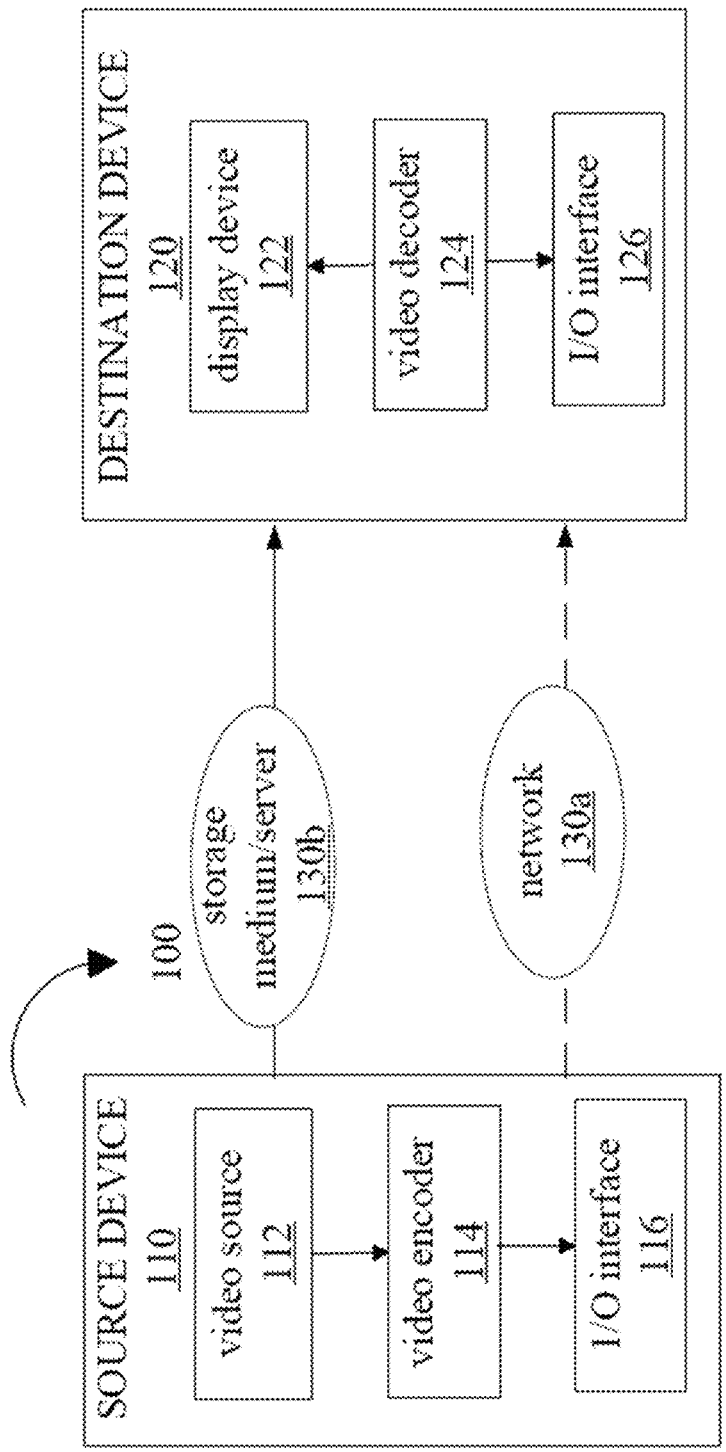
FIG. 22 is a block diagram that illustrates a video coding system in accordance with some embodiments of the present disclosure.

FIG. 13 is a block diagram illustrating an example of video decoder 300 which may be video decoder 114 in the system 100 illustrated in FIG. 22.

The video decoder 300 may be configured to perform any or all of the techniques of this disclosure. In the example of FIG. 13, the video decoder 300 includes a plurality of functional components. The techniques described in this disclosure may be shared among the various components of the video decoder 300. In some examples, a processor may be configured to perform any or all of the techniques described in this disclosure.

Figure 23:
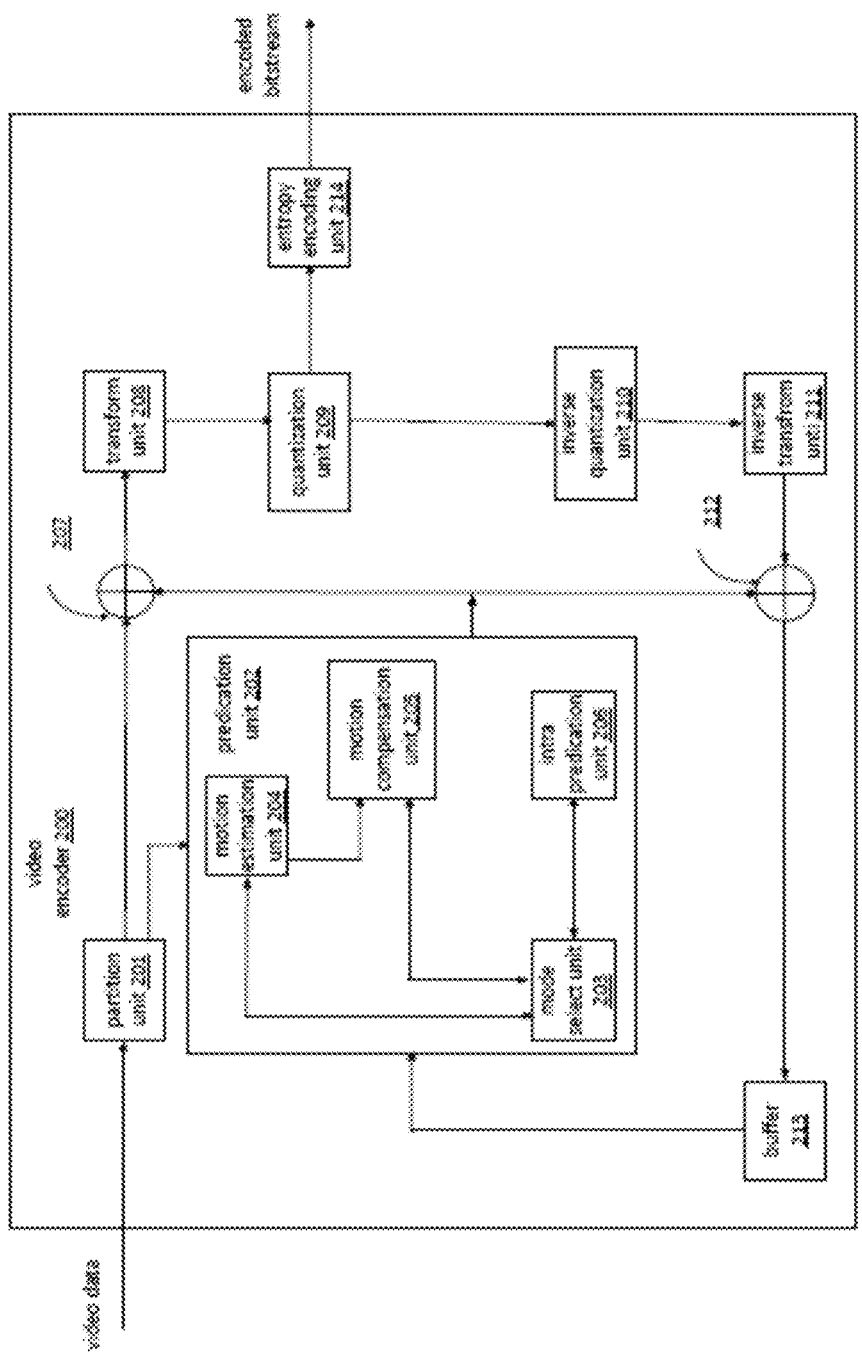
FIG. 23 is a block diagram that illustrates an encoder in accordance with some embodiments of the present disclosure.

In the example of FIG. 13, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 23).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 15A:
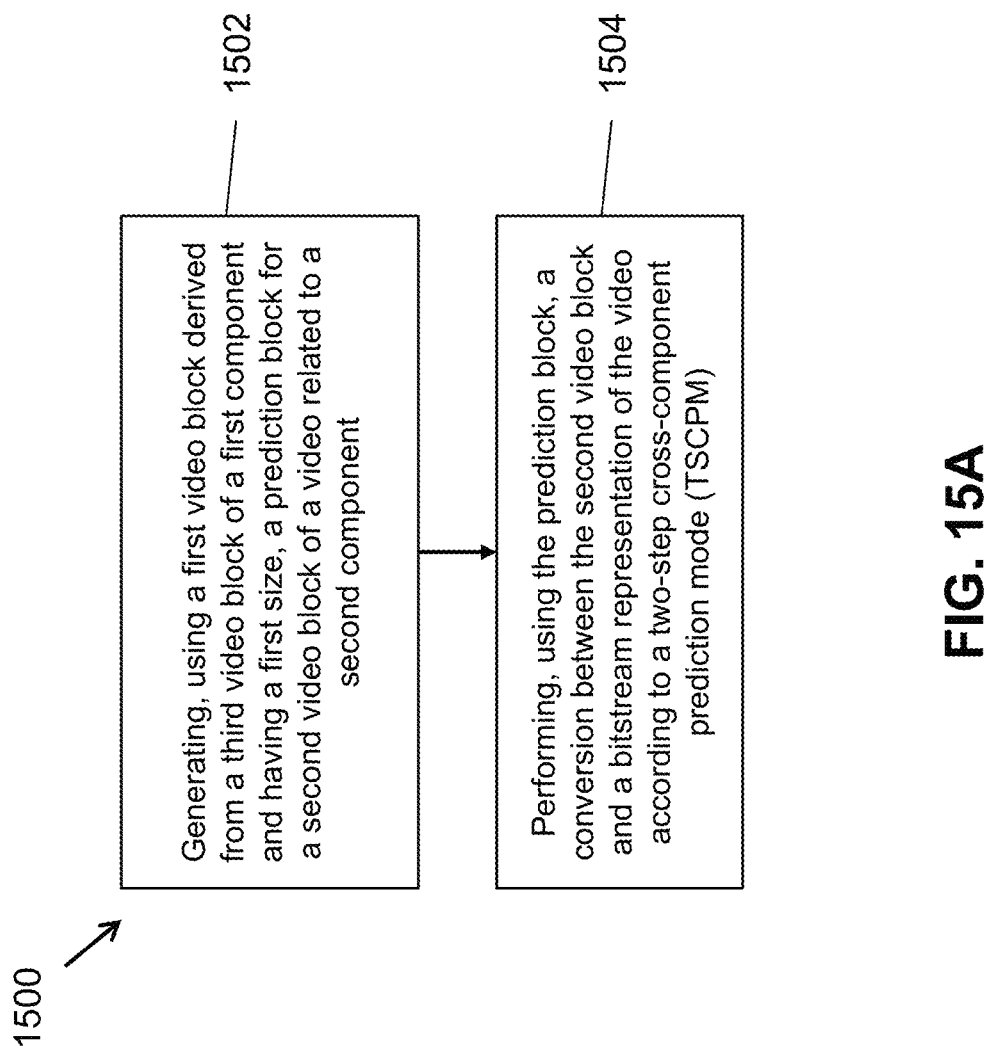
FIGS. 15A to 15C show three flowcharts for examples of video bitstream processing methods.

FIG. 15A show a flowchart for a first example of video bitstream processing method 1500. The method 1500 includes generating 1502, using a first video block derived from a third video block of a first component and having a first size, a prediction block for a second video block of a video related to a second component, where the first component is different from the second component, and where the second video block has a second size that is different from the first size. The method 1500 also includes performing 1504, using the prediction block, a conversion between the second video block and a bitstream representation of the video according to a two-step cross-component prediction mode (TSCPM). In embodiments for method 1500, the third video block of the first component is a reconstructed third video block of the first component, and where the reconstructed third video block has the first size. In one example for method 1500, the first video block may be a temporary C0 block, the second video block may be a C1 block, and the reconstructed third video block may be a reconstructed C0 block.

In embodiments for method 1500, the first size is (M'+W0)×(N'+H0), where the second size is M×N, and where either M' is unequal to M or N is unequal to N. In embodiments for method 1500, the first size is (M'+W0)×(N'+H0), where the second size is M×N, and where one or both of W0 and H0 are equal to a value of zero. In embodiments for method 1500, the first size is (M'+W0)×(N'+H0), where the second size is M×N, and where one or both of W0 and H0 are equal to a value of 1. In embodiments for method 1500, the first size is (M'+W0)×(N'+H0), where the second size is M×N, where W0 is one of: −2, −1, 0, 1, or 2, and where H0 is one of: −2, −1, 0, 1, or 2. In embodiments for method 1500, values for W0 and H0 are based on a color format of the video. In embodiments for method 1500, values for W0 and H0 are based on availability of another video block located to left of or above the first video block.

In embodiments for method 1500, the another video block is available in response to: the another video block being reconstructed, and/or (1) the another video block being in a same coding tree unit (CTU) row as the first video block, or (2) the another video block being in a same slice or tile as the first video block, or (3) the another video block being in a same CTU as the first video block. In embodiments for method 1500, W0 is equal to a value of 1 and H0 is equal to a value of zero in response to one video block located to the left of the first video block being available and one video block located above the first video block being not available. In embodiments for method 1500, W0 is equal to a value of zero and H0 is equal to a value of zero in response to one video block located to the left of the first video block being not available and one video block located above the first video block being not available.

In embodiments for method 1500, the first component is a luma component, and the second component is a chroma component. In embodiments for method 1500, the first component is a main color component, and the second component is a dependent color component. In embodiments for method 1500, the main color component is green, and the dependent color component is one of blue or red.

In embodiments for method 1500, the first video block is associated with a first set of samples and the reconstructed third video block is associated with a second set of samples, where at least one sample $S_{Temp}(x0, y0)$ in the first set of samples is derived as a linear function of a corresponding sample $S(x0,y0)$ from the second set of samples, and x0 is within a first range of zero to (M'−1), inclusive, and y0 is within a second range of zero to (N'−1), inclusive, and variables M' and N' describe a width and a height of the first size.

In embodiments for method 1500, the corresponding sample $S(x0,y0)$ is located at (x'+x0, y'+y0), and where (x', y') represents a top-left sample's coordinate of the third video block. In embodiments for method 1500, $S_{Temp}(x0, y0)$ is defined as $S(x0, y0)*a$. In embodiments for method 1500, $S_{Temp}(x0, y0)$ is defined as $(S(x0, y0)*a)>>k$. In embodiments for method 1500, $S_{Temp}(x0, y0)$ is defined as $((S(x0, y0)*a)>>k)+b$.

In embodiments for method 1500, parameters a, k, and b are defined as linear model parameters that are derived using a cross-component linear model (CCLM) mode. In embodiments, the method 1500 further includes clipping the $S_{Temp}(x0, y0)$ derived from the linear function.

In embodiments for method 1500, the first video block is associated with a first set of samples and the reconstructed third video block is associated with a second set of samples, and one sample from the first set of samples is derived from multiple samples from the second set of samples. In embodiments for method 1500, the first video block is derived based on at least one non-linear function of the reconstructed third video block. In embodiments for method 1500, the prediction block is generated by applying one or more downsampling filters to samples in the first video block. In embodiments for method 1500, the one or more downsampling filters are either pre-defined or signaled in slice, picture, coding tree unit (CTU) row, a group of CTUs, or a parameter set. In embodiments for method 1500, the one or more downsampling filters are signaled in a slice header, a picture header, a video parameter set (VPS), a sequence parameter set (SPS), or a picture parameter set (PPS).

In embodiments for method 1500, a selection of the one or more downsampling filters is based on a relative position of a sample to be predicted. In embodiments for method 1500, a selection of the one or more downsampling filters is based on a slice, a tile, or a picture type. In embodiments for method 1500, a selection of the one or more downsampling filters is based on availability of required samples during a downsampling process. In embodiments for method 1500, the one or more downsampling filters are either [1 1] or [1 2 1; 1 2 1] for a sample located at (0, 0) relative to the first video block. In embodiments for method 1500, the one or more downsampling filters include a 6-tap filter for a sample not located at (0, 0) relative to the first video block. In embodiments for method 1500, the 6-tap filter includes [1 2 1; 1 2 1].

In embodiments for method 1500, a prediction sample of the second video block comprising a chroma block only depends on K of the L corresponding luma reconstruction samples, where K is an integer value. In embodiments for method 1500, a prediction sample of the second video block comprising a chroma block only depends on samples located at $(2*x, 2*y)$, where x and y are integers and a top-left sample's coordinates of the first video block is set to (0, 0). In embodiments for method 1500, a prediction sample of the second video block comprising a chroma block only depends on samples located at $(2*x+1, 2*y)$, where x and y are integers and a top-left sample's coordinates of the first video block is set to (0, 0). In embodiments for method 1500, a prediction sample of the second video block comprising a chroma block only depends on samples located at $(2*x+1, 2*y+1)$, where x and y are integers and a top-left sample's coordinates of the first video block is set to (0, 0). In embodiments for method 1500, a prediction sample of the second video block comprising a chroma block only depends on samples located at $(2*x, 2*y+1)$, where x and y are integers and a top-left sample's coordinates of the first video block is set to (0, 0). In embodiments for method 1500, a prediction sample of the second video block comprising a chroma block only depends on samples located at $(2*x, 2*y)$ and $(2*x, 2*y+1)$, where x and y are integers and a top-left sample's coordinates of the first video block is set to (0, 0). In embodiments for method 1500, the one or more downsampling filter are selected by deriving linear model parameters.

In embodiments for method 1500, the linear model parameters are derived for each downsampling filter, where a corresponding distortion is calculated for each downsampling filter, and where a downsampling filter that achieves a minimum distortion is selected. In embodiments for method 1500, the one or more downsampling filters are applied based on a color format. In embodiments for method 1500, the prediction block is generated by applying upsampling filters, the first size is (M'+W0)×(N'+H0), the second size is M×N, and M is larger than M' or N is larger than N'. In embodiments for method 1500, samples in the prediction block are clipped prior to being used to generate the second video block. In embodiments, the method 1500 further includes determining linear model parameters related to the first video block or the prediction block, where the prediction block is generated based on the linear model parameters. In embodiments for method 1500, the linear model parameters are derived from neighboring reconstructed samples of the first component. In embodiments for method 1500, the linear model parameters are derived from neighboring reconstructed samples of the second component. In embodiments for method 1500, the linear model parameters are clipped to a range prior to being used either in the TSCPM or a cross-component linear model (CCLM) mode.

Figure 15B:
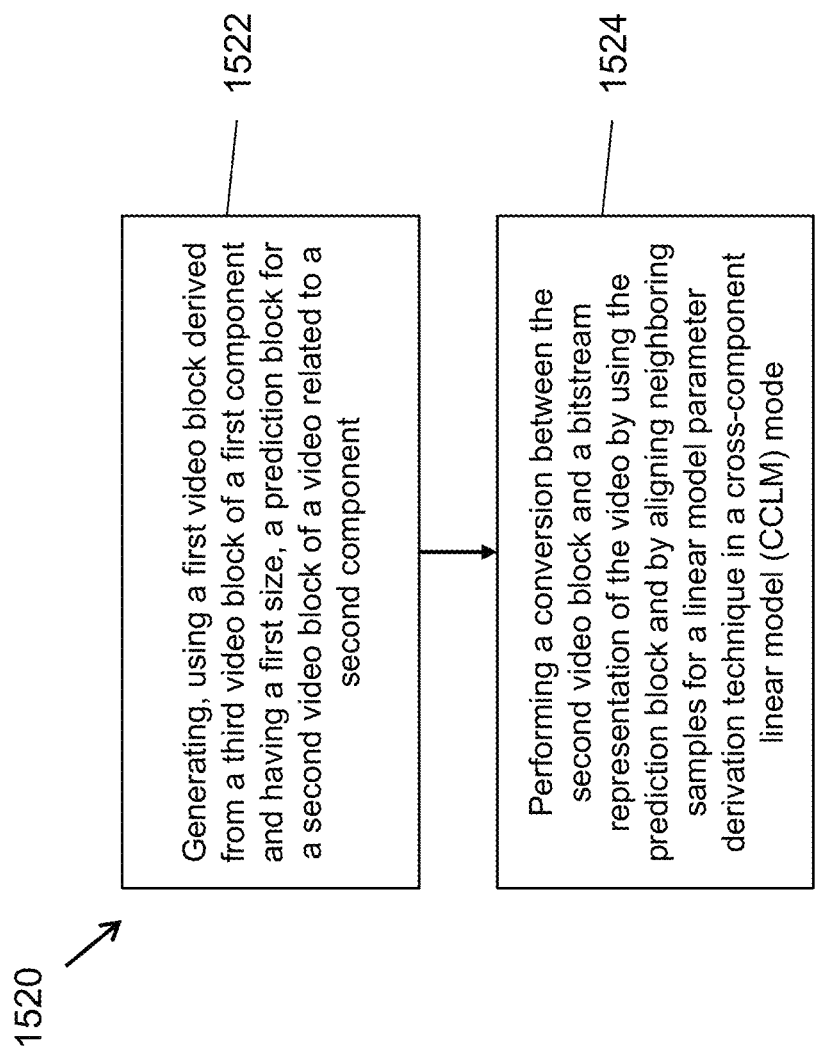

FIG. 15B show a flowchart for a second example of video bitstream processing method 1520. The method 1520 includes generating 1522, using a first video block derived from a third video block of a first component and having a first size, a prediction block for a second video block of a video related to a second component, where the first component is different from the second component, and where the second video block has a second size that is different from the first size. The method 1520 also includes performing 1524 a conversion between the second video block and a bitstream representation of the video by using the prediction block and by aligning neighboring samples for a linear model parameter derivation technique in a cross-component linear model (CCLM) mode. In embodiments for method 1520, the third video block of the first component is a reconstructed third video block of the first component, and where the reconstructed third video block has the first size. In one example for method 1520, the first video block may be a temporary C0 block, the second video block may be a C1 block, and the reconstructed third video block may be a reconstructed C0 block.

In embodiments for method 1520, available neighboring samples that fall within a size of a current block are used. In embodiments for method 1520, sub-sampling is applied to samples that fall within and outside of a border of a current block. In embodiments for method 1520, a same above or above-right samples are used to generate the second video block. In embodiments for method 1520, a same left or a same below-left samples are used to generate the second video block. In embodiments for method 1520, the prediction block for the second component is generated using an interpolation of a linear function of reconstructed samples of the first component. In embodiments for method 1520, the linear function is defined according to the TSCPM. In embodiments for method 1520, the prediction block for the second component is generated by applying a function of reconstructed samples of the first component.

In embodiments for method 1520, the first size is (M'+W0)×(N'+H0), where the second size is M×N, and where either M' is unequal to M or N is unequal to N. In embodiments for method 1520, the first size is (M'+W0)×(N'+H0), where the second size is M×N, and where one or both of W0 and H0 are equal to a value of zero. In embodiments for method 1520, the first size is (M'+W0)×(N'+H0), where the second size is M×N, and where one or both of W0 and H0 are equal to a value of 1. In embodiments for method 1520, the first size is (M'+W0)×(N'+H0), where the second size is M×N, where W0 is one of: −2, −1, 0, 1, or 2, and where H0 is one of: −2, −1, 0, 1, or 2. In embodiments for method 1520, values for W0 and H0 are based on a color format of the video. In embodiments for method 1520, values for W0 and H0 are based on availability of another video block located to left of or above the first video block.

In embodiments for method 1520, the another video block is available in response to: the another video block being reconstructed, and/or (1) the another video block being in a same coding tree unit (CTU) row as the first video block, or (2) the another video block being in a same slice or tile as the first video block, or (3) the another video block being in a same CTU as the first video block. In embodiments for method 1520, W0 is equal to a value of 1 and H0 is equal to a value of zero in response to one video block located to the left of the first video block being available and one video block located above the first video block being not available. In embodiments for method 1520, W0 is equal to a value of zero and H0 is equal to a value of zero in response to one video block located to the left of the first video block being not available and one video block located above the first video block being not available. In embodiments for method 1520, the first component is a luma component, and the second component is a chroma component. In embodiments for method 1520, the first component is a main color component, and the second component is a dependent color component. In embodiments for method 1520, the main color component is green, and the dependent color component is one of blue or red.

Figure 15C:
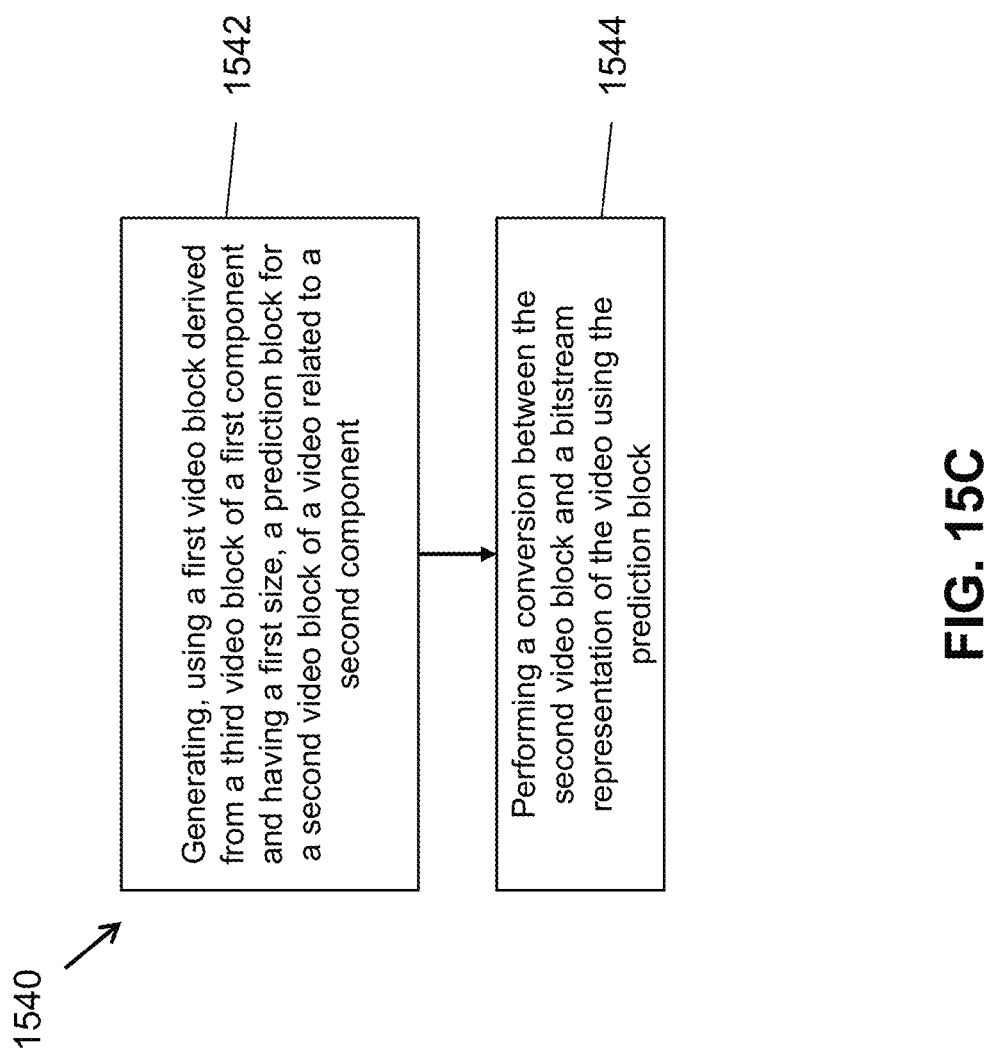

FIG. 15C show a flowchart for a third example of video bitstream processing method 1540. The method 1540 includes generating 1544, using a first video block derived from a third video block of a first component and having a first size, a prediction block for a second video block of a video related to a second component, where the first component is different from the second component, where the prediction block is generated using a prediction mode selected from a plurality of allowed prediction modes, and where the second video block has a second size that is different from the first size. The method 1540 also includes performing 1544 a conversion between the second video block and a bitstream representation of the video using the prediction block. In embodiments for method 1540, the third video block of the first component is a reconstructed third video block of the first component, and where the reconstructed third video block has the first size. In one example for method 1540, the first video block may be a temporary C0 block, the second video block may be a C1 block, and the reconstructed third video block may be a reconstructed C0 block.

In embodiments for method 1540, the prediction mode includes a two-step cross-component prediction mode (TSCPM), where the plurality of allowed prediction modes includes a plurality of TSCPM modes, where each TSCPM mode is associated with: a different linear model parameter derivation method, or a different downsampling or upsampling method, or a different location of reconstructed or downsampled reconstructed neighboring samples for linear model parameters derivation. In embodiments for method 1540, one TSCPM mode is defined to only utilize neighboring samples from an above row or from a right above row for linear model parameter derivation. In embodiments for method 1540, one TSCPM mode is defined to only utilize neighboring samples from a left column or from a left below column for linear model parameter derivation. In embodiments for method 1540, one TSCPM mode is defined to derive and to apply multiple linear models for generating the prediction block.

In embodiments for method 1540, current luma reconstruction blocks or neighboring reconstructed samples are split into M categories, where each M category utilizes a different linear model. In embodiments for method 1540, one TSCPM mode is defined to use a downsampling filter as a subsampling filter for generating the prediction block. In embodiments for method 1540, the first size is (M'+W0)× (N'+H0), where the second size is M×N, and where either M' is unequal to M or N is unequal to N. In embodiments for method 1540, the first size is (M'+W0)×(N'+H0), where the second size is M×N, and where one or both of W0 and H0 are equal to a value of zero. In embodiments for method 1540, the first size is (M'+W0)×(N'+H0), where the second size is M×N, and where one or both of W0 and H0 are equal to a value of 1. In embodiments for method 1540, the first size is (M'+W0)×(N'+H0), where the second size is M×N, where W0 is one of: −2, −1, 0, 1, or 2, and where H0 is one of: −2, −1, 0, 1, or 2. In embodiments for method 1540, values for W0 and H0 are based on a color format of the video. In embodiments for method 1540, values for W0 and H0 are based on availability of another video block located to left of or above the first video block.

In embodiments for method 1540, the another video block is available in response to: the another video block being reconstructed, and/or (1) the another video block being in a same coding tree unit (CTU) row as the first video block, or (2) the another video block being in a same slice or tile as the first video block, or (3) the another video block being in a same CTU as the first video block. In embodiments for method 1540, W0 is equal to a value of 1 and H0 is equal to a value of zero in response to one video block located to the left of the first video block being available and one video block located above the first video block being not available. In embodiments for method 1540, W0 is equal to a value of zero and H0 is equal to a value of zero in response to one video block located to the left of the first video block being not available and one video block located above the first video block being not available. In embodiments for method 1540, the first component is a luma component, and the second component is a chroma component. In embodiments for method 1540, the first component is a main color component, and the second component is a dependent color component. In embodiments for method 1540, the main color component is green, and the dependent color component is one of blue or red.

In embodiments for method(s) 1500, 1520, and/or 1540, a sample for the prediction block to be predicted is located at (x, y), and where a predictor for the sample in the prediction block for the second video block is generated using L corresponding reconstruction samples. In embodiments for method(s) 1500, 1520, and/or 1540, the L corresponded reconstruction samples comprise L corresponding luma reconstruction samples that are defined as samples located at (2*x−1, 2*y), (2*x−1, 2*y+1), (2*x, 2*y), (2*x, 2*y+1), (2*x+1, 2*y) and (2*x+1, 2*y+1). In embodiments for method(s) 1500, 1520, and/or 1540, K samples nearest a position (a, b) are used, and where values for (a, b) depend on a color format. In embodiments for method(s) 1500, 1520, and/or 1540, a=2*x, b=2*y, and the color format is 4:2:0 color format. In embodiments for method(s) 1500, 1520, and/or 1540, a prediction sample of the prediction block only depends on K of the L corresponding luma reconstruction samples, where K is an integer value. In embodiments for method(s) 1500, 1520, and/or 1540, a prediction sample of the prediction block only depends on a sample located at (2*x, 2*y).

In embodiments for method(s) 1500, 1520, and/or 1540, a prediction sample of the prediction block only depends on a sample located at (2*x+1, 2*y). In embodiments for method(s) 1500, 1520, and/or 1540, a prediction sample of the prediction block only depends on a sample located at (2*x+1, 2*y+1). In embodiments for method(s) 1500, 1520, and/or 1540, a prediction sample of the prediction block only depends on a sample located at (2*x, 2*y+1). In embodiments for method(s) 1500, 1520, and/or 1540, a prediction sample of the prediction block only depends on samples located at (2*x, 2*y) and (2*x, 2*y+1).

Figure 16A:
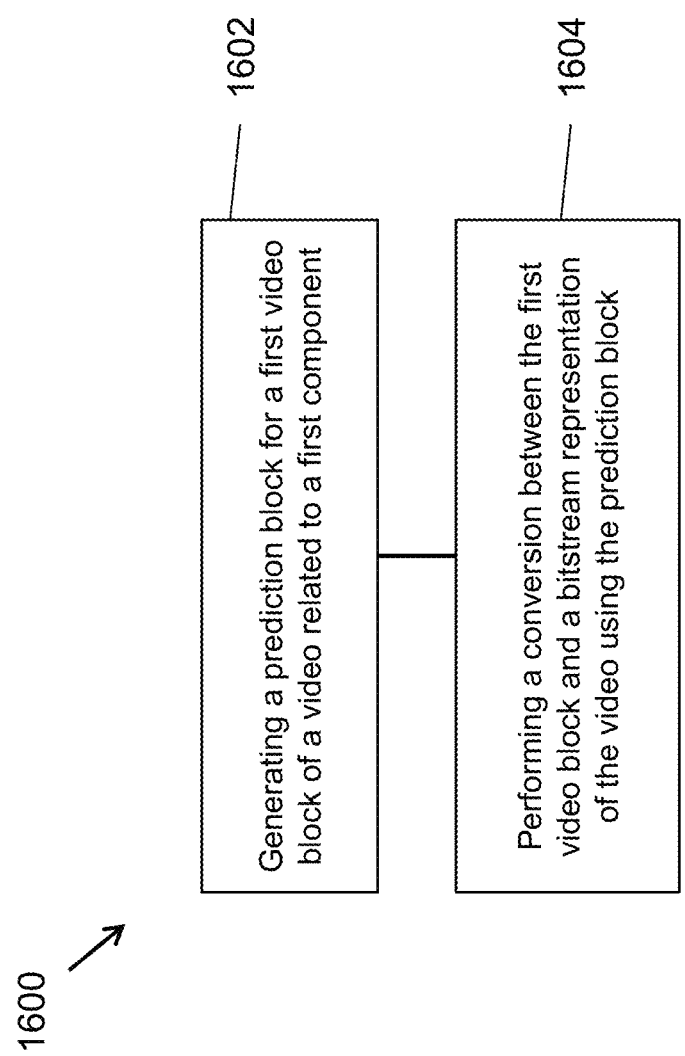
FIGS. 16A and 16B show two flowcharts for examples of video bitstream processing methods.

FIG. 16A shows a flowcharts for a fourth example of video bitstream processing method 1600. The method 1600 includes generating 1602 a prediction block for a first video block of a video related to a first component, where the prediction block is selectively generated according to a criterion by applying a two-step cross-component prediction mode (TSCPM). The method 1600 also includes performing 1604 a conversion between the first video block and a bitstream representation of the video using the prediction block, where a first field in the bitstream representation corresponds to the TSCPM. In embodiments for method 1600, the first video block uses the TSCPM and the prediction block is generated using a second video block derived from a third video block of a second component, and where the first component is different from the second component.

In embodiments for method 1600, the third video block of the second component is a reconstructed third video block of the second component. In one example for method 1600, the first video block may be a C1 block, the second video block may be a temporary C0 block, and the reconstructed third video block may be a reconstructed C0 block.

In embodiments for method 1600, the bitstream representation includes a first bin indicating usage of a mode predicted from a luma block followed by a second bin indicating usage of the TSCPM. In embodiments for method 1600, the bitstream representation includes a first bin indicating usage of the TSCPM followed by a second bin indicating usage of a mode predicted from a luma block. In embodiments for method 1600, the mode predicted from the luma block is a direct mode (DM). In embodiments for method 1600, an order of signaling of the mode predicted from a luma block or the TSCPM depends on a coded mode information of a spatial block.

In embodiments for method 1600, the TSCPM is indicated before the mode predicted from a luma block in response to a neighboring block being coded with the TSCPM. In embodiments for method 1600, the mode predicted from a luma block is indicated before the TSCPM in response to a neighboring block being coded with the mode predicted from a luma block. In embodiments for method 1600, the mode predicted from a luma block is indicated before the TSCPM in response to a neighboring block being coded with a non-TSCPM. In embodiments for method 1600, a shortest codeword is assigned to the indication of the mode predicted from a luma block, and where a second shortest codeword is assigned to an indication of the TSCPM.

In embodiments for method 1600, a shortest codeword is assigned to the indication of the TSCPM, and where a second shortest codeword is assigned to an indication of the mode predicted from a luma block. In embodiments for method 1600, the first field or the first bin or the second bin is bypass coded. In embodiments for method 1600, the first field or the first bin or the second bin is context coded. In embodiments for method 1600, each of the first field or the first bin or the second bin is context coded using a single context. In embodiments for method 1600, a first context for the first bin is same or different from a second context of the second bin. In embodiments for method 1600, the first field or the first bin or the second bin is context coded using multiple contexts. In embodiments for method 1600, the multiple contexts include two contexts, and where a selection of one context from the two contexts is based on the TSCPM being enabled for a spatial neighboring block.

In embodiments for method 1600, the spatial neighboring block is located to a left or top or top-right, or top-left or bottom-left. In embodiments for method 1600, a selected context index offset is X in response to a block A being available and the TSCPM being enabled for the block A and the selected context index offset is (1-X) in response to the block A being available and the TSCPM being not enabled for the block A. In embodiments for method 1600, the selected context index offset is X in response to the block A being unavailable and the TSCPM being enabled for the block A and the selected context index offset is (1-X) in response to the block A being unavailable and the TSCPM being not enabled for the block A. In embodiments for method 1600, where X is equal to 0 or 1. In embodiments for method 1600, the first field or the first bin or the second bin is context coded using three contexts, and where a selection of one context from the three contexts is based on the TSCPM being enabled for two spatial neighboring blocks.

In embodiments for method 1600, a selected context index offset is 2 in response to block A and block B being available and the TSCPM being enabled for the block A and the block B, the selected context index offset is 1 in response to one of the block A and the block B being available and the TSCPM being enabled for the one of the block A and the block B, and the selected context index offset is 0 in response to the block A and the block B being unavailable and the TSCPM being not enabled for the block A and the block B. In embodiments for method 1600, a selected context index offset is 0 in response to the block A and the block B being available and the TSCPM being enabled for the block A and the block B, the selected context index offset is 1 in response to one of the block A and the block B being available and the TSCPM being enabled for the one of the block A and the block B, and the selected context index offset is 2 in response to the block A and the block B being unavailable and the TSCPM being not enabled for the block A and the block B.

In embodiments for method 1600, a selected context index offset is 2 in response to the block A and the block B being unavailable and the TSCPM being enabled for the block A and the block B, the selected context index offset is 1 in response to one of the block A and the block B unavailable and the TSCPM being enabled for the one of the block A and the block B, and the selected context index offset is 0 in response to the block A and the block B being available and the TSCPM being not enabled for the block A and the block B. In embodiments for method 1600, a selected context index offset is 0 in response to the block A and the block B being unavailable and the TSCPM being enabled for the block A and the block B, the selected context index offset is 1 in response to one of the block A and the block B being unavailable and the TSCPM being enabled for the one of the block A and the block B, and the selected context index offset is 2 in response to the block A and the block B being available and the TSCPM being not enabled for the block A and the block B.

In embodiments for method 1600, a neighboring block is used for context selection for the first field or the first bin or the second bin, and where the neighboring block is indicated as being unavailable based on the neighboring block being outside of a current coding tree unit (CTU), a current CTU row, a region, a current slice, or a tile. In embodiments for method 1600, the neighboring block is being coded with the TSCPM. In embodiments for method 1600, the first field is a bin or an index. In embodiments for method 1600, the first field indicates whether the TSCPM is utilized, and the bitstream representation includes a second field which indicates which TSCPM from a plurality of TSCPMs is selected. In embodiments for method 1600, the first field is an index that has a value corresponding to at least one of a TSCPM, a direct mode (DM), an Intra prediction mode, where each of the TSCPM from a plurality of TSCPMs is treated as a new independent mode.

In embodiments for method 1600, the bitstream representation includes a shortest codeword that is assigned to a direct mode (DM) followed by the first field that indicates whether the TSCPM is utilized. In embodiments for method 1600, the bitstream representation includes a shortest codeword that is assigned to the first field that indicates whether the TSCPM is utilized. In embodiments for method 1600, a plurality of TSCPMs are associated with shorter codewords compared to intra chroma modes. In embodiments for method 1600, a plurality of TSCPMs are associated with shorter codewords compared to intra chroma modes other than direct mode (DM). In embodiments for method 1600, a codeword for DM is shorter than a plurality of codewords for the plurality of TSCPMs. In embodiments for method 1600, the TSCPM is selected from three TSCPMs (e.g., the three TSCPMs include TSCPM_Mode0, TSCPM_Mode1, and TSCPM_Mode2) according how neighboring samples are utilized.

In embodiments for method 1600, where the TSCPM_Mode0 indicates to use both left and above neighboring samples to derive linear model parameters, or where the TSCPM_Mode1 and TSCPM_Mode2 respectively indicate to use only left and only above neighboring samples to derive linear model parameters. In embodiments for method 1600, binarization of intra chroma modes is defined as shown below:

| Mode index | Mode | Bin string |
| --- | --- | --- |
| 0 | DM | 0 |
| 5 | TSCPM_Mode0 | 10 |
| 6 | TSCPM_Mode1 | 1110 |
| 7 | TSCPM_Mode2 | 1111 |
| 1 | DC | 11000 |
| 2 | HOR | 11001 |
| 3 | VER | 11010 |
| 4 | BI | 11011 |

In embodiments for method 1600, binarization of intra chroma modes is defined as shown below:

| Mode | Bin String |
| --- | --- |
| DM | 1 |
| TSCPM | 01 |
| Non-DM mode 0 | 001 |
| Non-DM mode 1 | 0001 |
| Non-DM mode 2 | 00001 |
| ... | |
| Non-DM mode (K-1) | 00000 |

In embodiments for method 1600, the TSCPM is selected from a plurality of TSCPMs, where the selected TSCPM is signaled followed by indications of the plurality of TSCPMs, and where binarization of intra chroma modes is defined as shown below:

| Mode | Bin String |
| --- | --- |
| TSCPM Mode0 | 1 |
| TSCPM Mode1 | 01 |
| TSCPM Mode2 | 001 |
| ... | |
| TSCPM Mode(M-1) | 00 ... 000 |

In embodiments for method 1600, the TSCPM is selected from a plurality of TSCPMs, where each TSCPM is directly coded, and where binarization of intra chroma modes is defined as shown below:

| Mode | Bin String |
| --- | --- |
| DM | 1 |
| TSCPM Mode 0 | 01 |
| TSCPM Mode 1 | 001 |
| ... | |
| TSCPM Mode (M-1) | 000 ... 1 (there are M 0s) |
| Non-DM mode 0 | 0000 ... 1 |
| Non-DM mode 1 | 00000 ... 1 |
| ... | |
| Non-DM mode (K-1) | 000000 ... 1 |

In embodiments for method 1600, the bitstream representation is included in a parameter set or a picture or a slice or a tile group header or group of coding tree units (CTUs) or a CTU or other kinds of video data units. In embodiments for method 1600, the bitstream representation is included in a sequence parameter set (SPS) or a video parameter set (VPS) or a picture parameter set (PPS) or a picture header or a slice header.

Figure 16B:
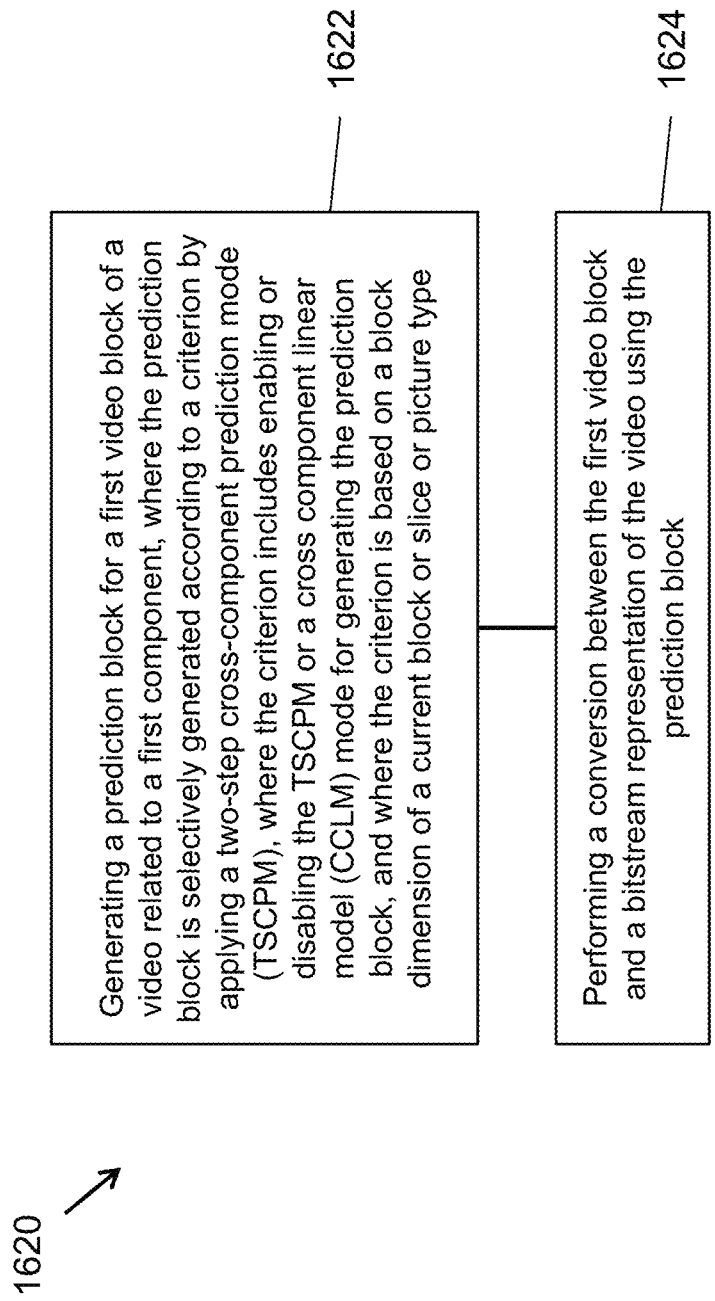

FIG. 16B shows a flowchart for a fifth example of video bitstream processing method 1620. The method 1620 includes generating 1622 a prediction block for a first video block of a video related to a first component, where the prediction block is selectively generated according to a criterion by applying a two-step cross-component prediction mode (TSCPM), where the criterion includes enabling or disabling the TSCPM or a cross component linear model (CCLM) mode for generating the prediction block, and where the criterion is based on a block dimension of a current block or slice or picture type. The method 1620 also includes performing 1624 a conversion between the first video block and a bitstream representation of the video using the prediction block, where a first field in the bitstream representation corresponds to the TSCPM.

In embodiments for method 1620, the first video block uses the TSCPM and the prediction block is generated using a second video block derived from a third video block of a second component, and where the first component is different from the second component. In embodiments for method 1620, the third video block of the second component is a reconstructed third video block of the second component. In one example for method 1620, the first video block may be a C1 block, the second video block may be a temporary C0 block, and the reconstructed third video block may be a reconstructed C0 block.

In embodiments for method 1620, upon determining that chroma blocks have a number of samples greater than or equal to M, the TSCPM or the CCLM mode is disabled for generating the prediction block. In embodiments for method 1620, the M is 4096 or 1024. In embodiments for method 1620, upon determining that chroma blocks have a width or a height greater than or equal to M, the TSCPM or the CCLM mode is disabled for generating the prediction block. In embodiments for method 1620, the M is 64 or 32. In embodiments for method 1620, upon determining that chroma blocks have a width or a height less than or equal to M, the TSCPM or the CCLM mode is disabled for generating the prediction block. In embodiments for method 1620, the M is 2 or 4.

In embodiments for method 1620, an indication for the TSCPM or the CCLM mode is not sent in the bitstream representation in response to the TSCPM or the CCLM mode being disabled for generating the prediction block. In embodiments for methods 1600 and 1620, the second component is a luma component, and the first component is a chroma component. In embodiments for methods 1600 and 1620, the second component is a main color component, and the first component is a dependent color component. In embodiments for methods 1600 and 1620, the main color component is green, and the dependent color component is one of blue or red.

Figure 17:
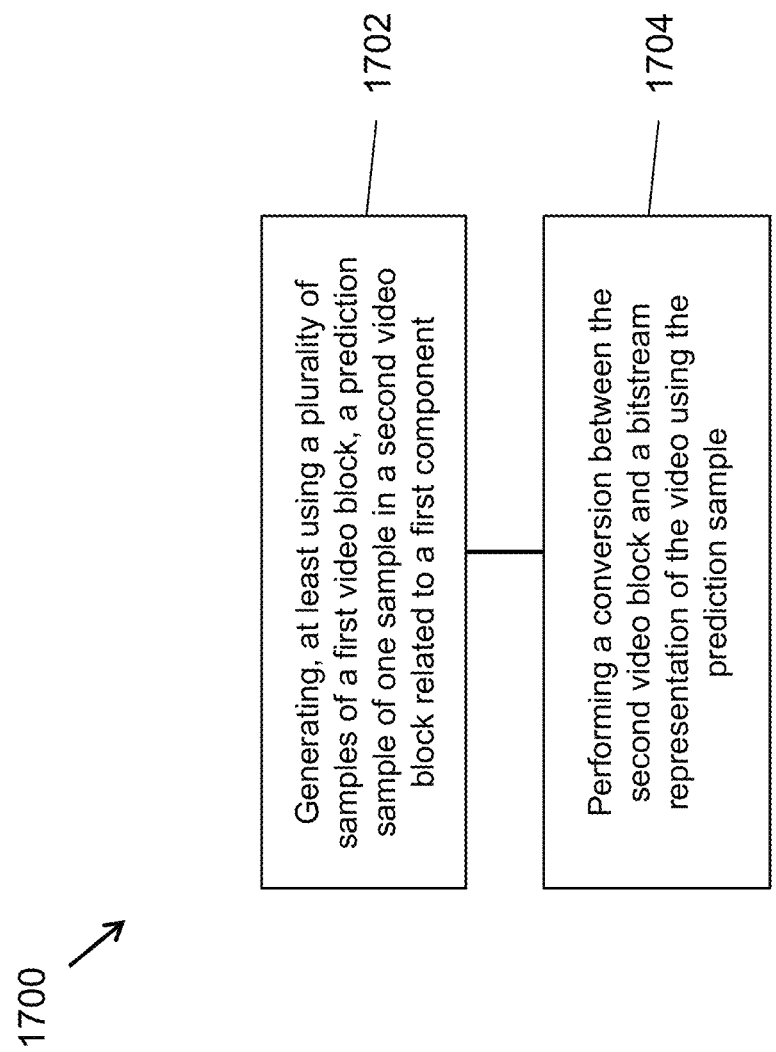
FIG. 17 is a flowchart for an example of a video bitstream processing method.

FIG. 17 is a flowchart for a fifth example of a video bitstream processing method 1700. The method 1700 includes generating 1702, at least using a plurality of samples of a first video block, a prediction sample of one sample in a second video block related to a first component, where the prediction sample is generated by applying a multiple parameter model that the sample of the second video block is associated with, to the plurality of samples of the first video block. The method 1700 also includes performing 1704 a conversion between the second video block and a bitstream representation of the video using the prediction sample. In embodiments for method 1700, the first video block is a third video block of a second component. In embodiments for method 1700, the first video block is obtained using a third video block of a second component. In embodiments for method 1700, the first component is different from the second component. In embodiments for method 1700, the third video block of the second component is a reconstructed third video block of the second component. In one example for method 1700, the first video block may be a temporary C0 block, the second video block may be a C1 block, and a third video block is a reconstructed C0 block.

In embodiments for method 1700, each sample of the plurality of samples of the first video block is assigned one weighting parameter. In embodiments for method 1700, the one sample in the second video block is a function of a corresponding sample in the plurality of samples of the first video block and a weighting parameter for the corresponding sample. In embodiments for method 1700, the one sample in the second video block is located at located at (x, y), the plurality of samples of the first video block are located at $(2*x-1, 2*y)$, $(2*x-1, 2*y+1)$, $(2*x, 2*y)$, $(2*x, 2*y+1)$, $(2*x+1, 2*y)$ and $(2*x+1, 2*y+1)$. In embodiments for method 1700, the one sample in the second video block is located at located at (x, y), the plurality of samples of the first video block are located at $(2*x, 2*y)$ and $(2*x, 2*y+1)$. In embodiments for method 1700, a number of the plurality of samples and locations of the plurality of samples depends on a location of the one sample in the second video block.

In embodiments for method 1700, a number of the plurality of samples and locations of the plurality of samples depends on availability of the plurality of samples. In embodiments for method 1700, a prediction value of the one sample in the second video block is calculated using a formula: $\Sigma_{k=0}^{L-1} a^k * S_{c0}^k$, where the plurality of L samples are denoted by $S_{c0}^k$, and a plurality of weighting parameters are denoted by $a^k$. In embodiments for method 1700, a prediction value of the one sample in the second video block is calculated using a formula: $(\Sigma_{k=0}^{L-1} a^k * S_{c0}^k) >> M$, where M is an integer, where the plurality of L samples are denoted by $S_{c0}^k$, and a plurality of weighting parameters are denoted by $a^k$. In embodiments for method 1700, a prediction value of the one sample in the second video block is calculated using a formula: $Clip3((\Sigma_{k=0}^{L-1} a^k * S_{c0}^k) >> M)$, where Clip3 operation clips the prediction value within a valid range, where the plurality of L samples are denoted by $S_{c0}^k$, and a plurality of weighting parameters are denoted by $a^k$. In embodiments for method 1700, a prediction value of the one sample in the second video block is calculated using a formula: $((\Sigma_{k=0}^{L-1} a^k * S_{c0}^k) >> M) + b$, where b is an integer, where the plurality of L samples are denoted by $S_{c0}^k$, and a plurality of weighting parameters are denoted by $a^k$.

In embodiments for method 1700, a prediction value of the one sample in the second video block is calculated using a formula: $Clip3(((\Sigma_{k=0}^{L-1} a^k * S_{c0}^k) >> M) + b)$, where M and b are integers, where the Clip3 operation clips the prediction value within a valid range, where the plurality of L samples are denoted by $S_{c0}^k$, and a plurality of weighting parameters are denoted by $a^k$. In embodiments for method 1700, a prediction value of the one sample in the second video block is calculated using a formula: $\Sigma_{k=0}^{L-1} (a^k * s_{c0}^k + b^k)$, where b is an integer, where the plurality of L samples are denoted by $S_{c0}^k$, and a plurality of weighting parameters are denoted by $a^k$. In embodiments for method 1700, a prediction value of the one sample in the second video block is calculated using a formula: $Clip3(\Sigma_{k=0}^{L-1} (a^k * s_{c0}^k + b^k))$, where b is an integer, where the Clip3 operation clips the prediction value within a valid range, where the plurality of L samples are denoted by $S_{c0}^k$, and a plurality of weighting parameters are denoted by $a^k$.

In embodiments for method 1700, a prediction value of the one sample in the second video block is calculated using a formula: $\Sigma_{k=0}^{L-1} (((a^k * s_{c0}^k) >> M^k) + b^k)$ where b is an integer, where the plurality of L samples are denoted by $S_{c0}^k$, and a plurality of weighting parameters are denoted by $a^k$. In embodiments for method 1700, a prediction value of the one sample in the second video block is calculated using a formula: $Clip3(\Sigma_{k=0}^{L-1} (((a^k * s_{c0}^k) >> M^k) + b^k))$, where b is an integer, where the Clip3 operation clips the prediction value within a valid range, where the plurality of L samples are denoted by $S_{c0}^k$, and a plurality of weighting parameters are denoted by $a^k$. In embodiments for method 1700, six weighting parameters are correspondingly applied to six samples of the plurality of samples. In embodiments for method 1700, the six weighting parameters have a following relationship: $a^0 = a^1 = 2 \times a^2 = 2 \times a^3 = 2 \times a^4 = 2 \times a^5$, where $a^0, a^1, a^2, a^3, a^4$ and $a^5$ are the six weighting parameters. In embodiments for method 1700, a plurality of predefined relationships exists between parameters of the formula. In embodiments for method 1700, one predefined relationship is selected from the plurality of predefined relationships.

In embodiments for method 1700, a selection of the one predefined relationship is either derived by a decoder or signaled by an encoder to the decoder in a parameter set, a slice, a tile group, a tile, a coding tree unit (CTU) row, a CTU, a coding unit (CU), or a prediction unit (PU). In embodiments for method 1700, the selection of the one predefined relationship is signaled by the encoder to the decoder in a video parameter set (VPS), a sequence parameter set (SPS), a picture parameter set (PPS), or a slice header. In embodiments for method 1700, the second component is a luma component, and the first component is a chroma component. In embodiments for method 1700, the second component is a main color component, and the first component is a dependent color component. In embodiments for method 1700, the main color component is green, and the dependent color component is one of blue or red.

It will be appreciated that the disclosed techniques may be embodied in video encoders or decoders to improve compression efficiency.

Figure 20:
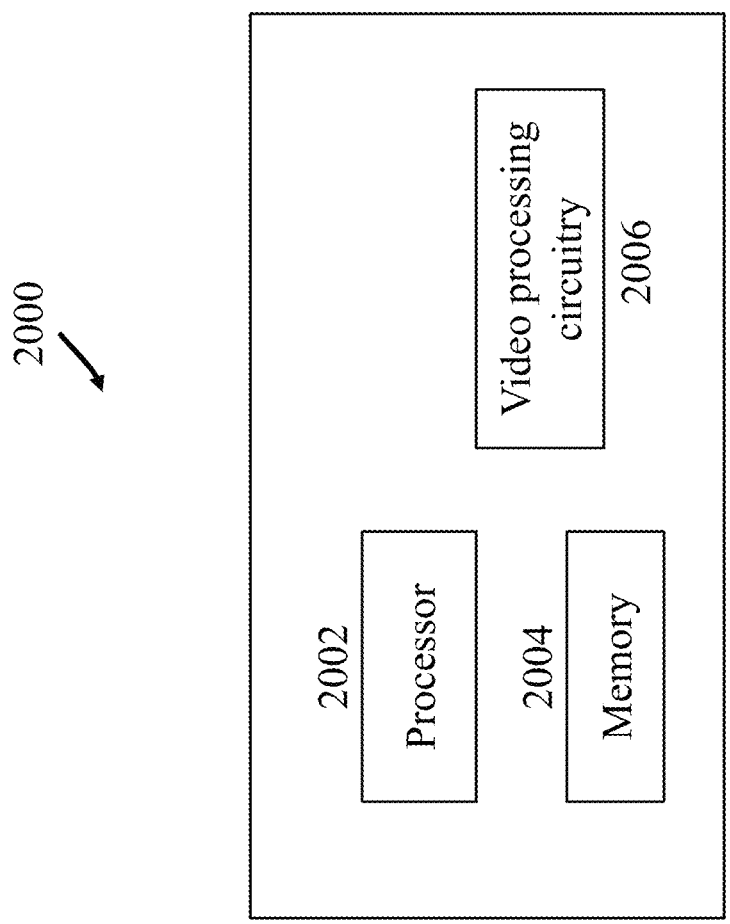
FIG. 20 is a block diagram of a video processing apparatus.

FIG. 20 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods (including, but not limited to, method 1500, 1520, 1540, 1600, 1620, and 1700) described in the present document. The memory (memories) 2004 may be used for storing data and code used for implementing the methods and techniques described herein. The video processing hardware 2006 may be used to implement, in hardware circuitry, some techniques described in the present document. In some embodiments, the video coding methods may be implemented using an apparatus that is implemented on a hardware platform as described with respect to FIG. 20.

Figure 21:
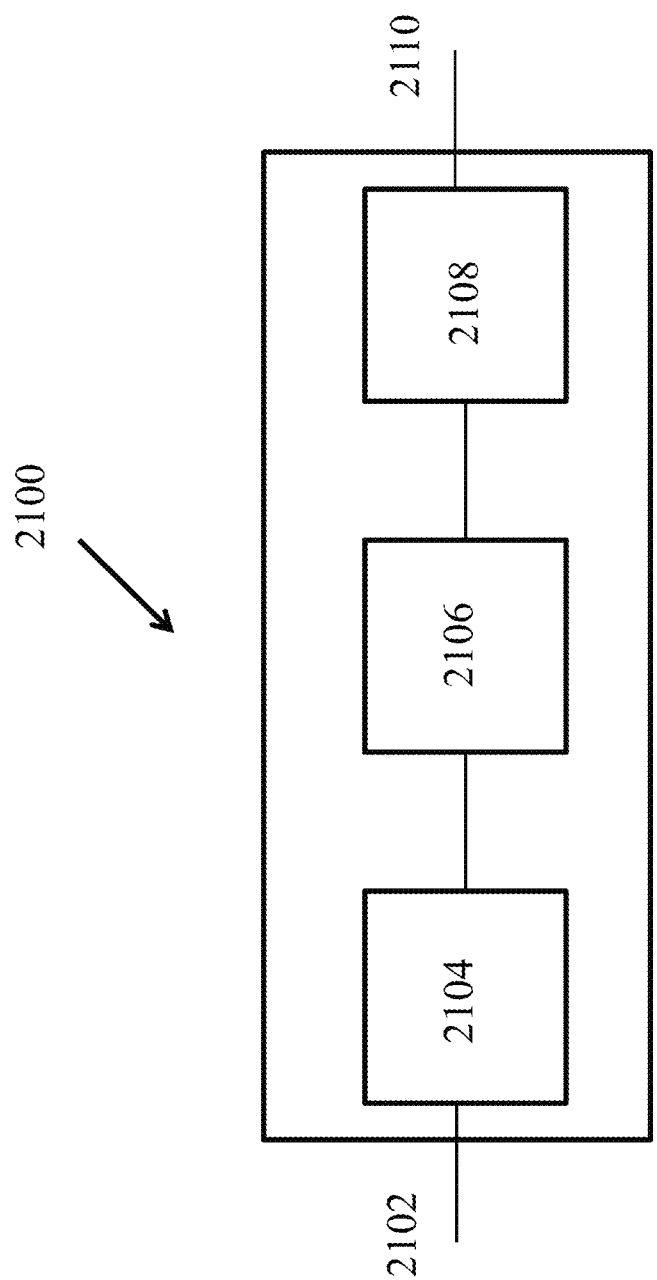
FIG. 21 is a block diagram showing an example video processing system in which various techniques disclosed herein may be implemented.

FIG. 21 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

FIG. 22 is a block diagram that illustrates an example video coding system 100 that may utilize the techniques of this disclosure. As shown in FIG. 22, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

FIG. 23 is a block diagram illustrating an example of video encoder 200, which may be video encoder 114 in the system 100 illustrated in FIG. 22.

Video encoder 200 may be configured to perform any or all of the techniques of this disclosure. In the example of FIG. 23, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy(IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 23 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

The following section describes another set of solutions.

Solution 1. A method for processing video comprises deriving a first video block with a first size related to a first color component from a reconstructed third video block of the first color component; using, by a processor, the first video block related to the first color component to generate a prediction block for a second video block with a second size related to a second color component, the first color component and the second color component being different color components, the first size and the second size being different; and generating the second video block related to the second color component using the prediction block.

Solution 2. The method of solution 1, where the first size is (M'+W0)×(N'+H0), the second size is M×N, and one or both of: M' is unequal to M, or N is unequal to N.

Solution 3. The method of solution 1, where the first size is (M'+W0)×(N'+H0), the second size is M×N, and one or both of W0 and H0 are zero.

Solution 4. The method of solution 1, the first size is (M'+W0)×(N'+H0), the second size is M×N, and one or both of W0 and H0 are 1.

Solution 5. The method of solution 1, where the first size is (M'+W0)×(N'+H0), the second size is M×N, W0 is one of: −2, −1, 0, 1, or 2, and H0 is one of: −2, −1, 0, 1, or 2.

Solution 6. The method of solution 1, further comprises determining a color format of the first video block, and where the first size is (M'+W0)×(N'+H0), the second size is M×N, and W0 and/or H0 are based on the color format.

Solution 7. The method of solution 1, further comprises determining that a left or above block in relation to the first video block is available, and where one or both of W0 or H0 are based on the determination that the left or above block is available.

Solution 8. The method of solution 1, where the first color component is a luma component, and the second color component is a chroma component.

Solution 9. The method of solution 1, where the first color component is a main color component, and the second color component is a dependent color component.

Solution 10. The method of solution 9, where the main color component is green, and the dependent color component is one of blue or red.

Solution 11. The method of solution 1, where deriving the first video block is based on a reconstructed version of a third video block, and the derivation is based on a linear function related to the first video block and the third video block.

Solution 12. The method of solution 1, where generating the prediction block includes applying a downsampling filter.

Solution 13. The method of solution 12, where two or more downsampling filters are applied.

Solution 14. The method of solution 12, where application of the downsampling filter is signaled in a slice header, a picture header, coding tree unit (CTU) row, a group of CTUs, a video parameter set (VPS), a sequence parameter set (SPS), or a picture parameter set (PPS).

Solution 15. The method of solution 12, where the downsampling filter is selected based on a relative position of a sample.

Solution 16. The method of solution 12, where the downsampling filter is selected based on one or more of a slice, a tile, or a picture type.

Solution 17. The method of solution 12, where the downsampling filter is applied based on availability of required samples.

Solution 18. The method of solution 12, where the downsampling filter is applied based on a color format.

Solution 19. The method of solution 1, where generating the prediction block includes applying an upsampling filter.

Solution 20. The method of solution 1, further comprises determining linear model parameters related to the first video block or the prediction block, where generating the prediction block is based on the linear model parameters.

Solution 21. The method of solution 20, where the linear model parameters are derived from neighboring reconstructed samples of the first color component.

Solution 22. The method of solution 20, where the linear model parameters are derived from neighboring reconstructed samples of the first color component.

Solution 23. A method for processing video, comprising:
  receiving, by a processor, a signal having a flag indicating that a two-step inter-component prediction (TSICP) technique is to be applied to generate a first video block related to a first color component;
  performing further processing of the first video block based on the TSICP.

Solution 24. The method of solution 23, where the signal includes a first bin indicating usage of a direct mode (DM), and a second bin indicating usage of TSICP, the second bin after the first bin.

Solution 25. The method of solution 23, where the signal includes a first bin indicating usage of TSICP, and a second bin indicating usage of a direct mode (DM), the second bin after the first bin.

Solution 26. The method of solution 23, where the flag is bypass coded.

Solution 27. The method of solution 23, where the flag is context coded.

Solution 28. The method of solution 27, where the flax is context coded with a first context and a second context.

Solution 29. The method of solution 28, where selection of the first context is based on TSICP being enabled for a spatial neighboring block.

Solution 30. The method of solutions 27 or 28, where the selected context index is block A is available and TSICP is enabled for one of: block A? 1:0 or block A? 0:1.

Solution 31. The method of solutions 27 or 28, where the selected context index is block A is unavailable and TSICP is enabled for block A? 0:1.

Solution 32. The method of solution 23, where the flax is context coded with three contexts, and selection of a first context of the three contexts is based on TSICP being enabled for two spatial neighboring blocks.

Solution 33. The method of solutions 27, 28, or 32, where the selected context index is one of: block A is available and TSICP is enabled for block A? 1:0 and block B is available and TSICP is enabled for block B? 1:0, block A is available and TSICP is enabled for block A? 0:1 and block B is available and TSICP is enabled for block B? 0:1, block A is unavailable or TSICP is enabled for block A? 1:0 and block B is unavailable and TSICP is enabled for block B? 1:0, or block A is unavailable or TSICP is enabled for block A? 0:1 and block B is unavailable and TSICP is enabled for block B? 0:1.

Solution 34. The method of solutions 23-33, where a neighboring block is used for context selection for the flag and indicated as unavailable based on the neighboring block being outside of a current coding tree unit (CTU), a current CTU row, a region, a current slice, or a tile.

Solution 35. The method of solution 1, further comprises aligning neighboring samples for a linear model parameter derivation technique used to generate the second video block related to the second color component.

Solution 36. The method of solution 35, where available neighboring samples are used rather than sub-sampling along a longer side.

Solution 37. The method of solution 35, where sub-sampling is applied to a longer side.

Solution 38. The method of solution 35, where a same above or above-right samples are used.

Solution 39. The method of solution 35, where a same left or a same below-left samples are used.

Solution 40. The method of solution 1, where a down-sampling filter is determined to be applied at an encoder-side and signaled to a decoder-side in a SPS, a VPS, a PPS, a slice header, a tile header, a CTU, or a coding unit (CU).

Solution 41. The method of solution 1, where a multiple-parameter model is used to generate the prediction block, and where multiple first samples related to the first color component are associated with a second sample related to the second color component, and where the first samples are assigned a corresponding weighting parameter.

Solution 42. The method of solution 41, where the second sample is located at (x, y), and the first samples located at $(2*x-1, 2*y)$, $(2*x-1, 2*y+1)$, $(2*x, 2*y)$, $(2*x, 2*y+1)$, $(2*x+1, 2*y)$ and $(2*x+1, 2*y+1)$.

Solution 43. The method of solution 41, where the second sample is located at (x, y), and the first samples located at $(2*x, 2*y)$ and $(2*x, 2*y+1)$.

Solution 44. The method of solution 41, where a number of the first samples is based on a coordinate of the second sample.

Solution 45. The method of solution 41, where relationships between parameters are predefined.

Solution 46. The method of solution 41, where relationships between parameters include two or more relationships that are predefined.

Solution 47. The method of solution 46, where the a first relationship of the relationships is selected on a decoder-side, and the selection is indicated from an encoder-side to the decoder-side in a VPS, a SPS, a PPS, a slice header, a tile group, a tile, a CTU row, a CTU, a CU, or a prediction unit (PU).

Solution 48. A method for processing video, comprising:
using, by a processor, a first video block related to a first color component to generate a prediction block for a second video block related to a second color component, the first color component and the second color component being different color components; and
generating the second video block related to the second color component using the prediction block.

Solution 1A. A method for processing video comprises deriving a first video block with a first size related to a first color component from a reconstructed third video block of the first color component; using, by a processor, the first video block related to the first color component to generate a prediction block for a second video block with a second size related to a second color component, the first color component and the second color component being different color components, the first size and the second size being different; and generating the second video block related to the second color component using the prediction block.

Solution 2A. The method of solution 1A, where the first size is (M'+W0)×(N'+H0), the second size is M×N, and one or both of: M' is unequal to M, or N is unequal to N.

Solution 3A. The method of solution 1A, where the first size is (M'+W0)×(N'+H0), the second size is M×N, and one or both of W0 and H0 are zero.

Solution 4A. The method of solution 1A, the first size is (M'+W0)×(N'+H0), the second size is M×N, and one or both of W0 and H0 are 1.

Solution 5A. The method of solution 1A, where the first size is (M'+W0)×(N'+H0), the second size is M×N, W0 is one of: −2, −1, 0, 1, or 2, and H0 is one of: −2, −1, 0, 1, or 2.

Solution 6A. The method of solution 1A, further comprises determining a color format of the first video block, and where the first size is (M'+W0)×(N'+H0), the second size is M×N, and W0 and/or H0 are based on the color format.

Solution 7A. The method of solution 1A, further comprises determining that a left or above block in relation to the first video block is available, and where one or both of W0 or H0 are based on the determination that the left or above block is available.

Solution 8A. The method of solution 1A, where the first color component is a luma component, and the second color component is a chroma component.

Solution 9A. The method of solution 1A, where the first color component is a main color component, and the second color component is a dependent color component.

Solution 10A. The method of solution 9A, where the main color component is green, and the dependent color component is one of blue or red.

Solution 11A. The method of solution 1A, where deriving the first video block is based on a reconstructed version of a third video block, and the derivation is based on a linear function related to the first video block and the third video block.

Solution 12A. The method of solution 1A, where generating the prediction block includes applying a downsampling filter.

Solution 13A. The method of solution 12A, where two or more downsampling filters are applied.

Solution 14A. The method of solution 12A, where application of the downsampling filter is signaled in a slice header, a picture header, coding tree unit (CTU) row, a group of CTUs, a video parameter set (VPS), a sequence parameter set (SPS), or a picture parameter set (PPS).

Solution 15A. The method of solution 12A, where the downsampling filter is selected based on a relative position of a sample.

Solution 16A. The method of solution 12A, where the downsampling filter is selected based on one or more of a slice, a tile, or a picture type.

Solution 17A. The method of solution 12A, where the downsampling filter is applied based on availability of required samples.

Solution 18A. The method of solution 12A, where the downsampling filter is applied based on a color format.

Solution 19A. The method of solution 1A, where generating the prediction block includes applying an upsampling filter.

Solution 20A. The method of solution 1A, further comprises determining linear model parameters related to the first video block or the prediction block, where generating the prediction block is based on the linear model parameters.

Solution 21A. The method of solution 20A, where the linear model parameters are derived from neighboring reconstructed samples of the first color component.

Solution 22A. The method of solution 20A, where the linear model parameters are derived from neighboring reconstructed samples of the first color component.

Solution 23A. A method for processing video comprises receiving, by a processor, a signal having a flag indicating that a two-step inter-component prediction (TSICP) technique is to be applied to generate a first video block related to a first color component; and performing further processing of the first video block based on the TSICP.

Solution 24A. The method of solution 23A, where the signal includes a first bin indicating usage of a direct mode (DM), and a second bin indicating usage of TSICP, the second bin after the first bin.

Solution 25A. The method of solution 23A, where the signal includes a first bin indicating usage of TSICP, and a second bin indicating usage of a direct mode (DM), the second bin after the first bin.

Solution 26A. The method of solution 23A, where the flag is bypass coded.

Solution 27A. The method of solution 23A, where the flag is context coded.

Solution 28A. The method of solution 27A, where the flax is context coded with a first context and a second context.

Solution 29A. The method of solution 28A, where selection of the first context is based on TSICP being enabled for a spatial neighboring block.

Solution 30A. The method of solutions 27A or 28A, where the selected context index is block A is available and TSICP is enabled for one of: block A? 1:0 or block A? 0:1.

Solution 31A. The method of solutions 27A or 28A, where the selected context index is block A is unavailable and TSICP is enabled for block A? 0:1.

Solution 32A. The method of solution 23A, where the flax is context coded with three contexts, and selection of a first context of the three contexts is based on TSICP being enabled for two spatial neighboring blocks.

Solution 33A. The method of solutions 27A, 28A, or 32A, where the selected context index is one of: block A is available and TSICP is enabled for block A? 1:0 and block B is available and TSICP is enabled for block B? 1:0, block A is available and TSICP is enabled for block A? 0:1 and block B is available and TSICP is enabled for block B? 0:1, block A is unavailable or TSICP is enabled for block A? 1:0 and block B is unavailable and TSICP is enabled for block B? 1:0, or block A is unavailable or TSICP is enabled for block A? 0:1 and block B is unavailable and TSICP is enabled for block B? 0:1.

Solution 34A. The method of solutions 23A-33A, where a neighboring block is used for context selection for the flag and indicated as unavailable based on the neighboring block being outside of a current coding tree unit (CTU), a current CTU row, a region, a current slice, or a tile.

Solution 35A. The method of solution 1A, further comprises aligning neighboring samples for a linear model parameter derivation technique used to generate the second video block related to the second color component.

Solution 36A. The method of solution 35A, where available neighboring samples are used rather than sub-sampling along a longer side.

Solution 37A. The method of solution 35A, where sub-sampling is applied to a longer side.

Solution 38A. The method of solution 35A, where a same above or above-right samples are used.

Solution 39A. The method of solution 35A, where a same left or a same below-left samples are used.

Solution 40A. The method of solution 1A, where a downsampling filter is determined to be applied at an encoder-side and signaled to a decoder-side in a SPS, a VPS, a PPS, a slice header, a tile header, a CTU, or a coding unit (CU).

Solution 41A. The method of solution 1A, where a multiple-parameter model is used to generate the prediction block, and where multiple first samples related to the first color component are associated with a second sample related to the second color component, and where the first samples are assigned a corresponding weighting parameter.

Solution 42A. The method of solution 41A, where the second sample is located at (x, y), and the first samples located at (2*x−1, 2*y), (2*x−1, 2*y+1), (2*x, 2*y), (2*x, 2*y+1), (2*x+1, 2*y) and (2*x+1, 2*y+1).

Solution 43A. The method of solution 41A, where the second sample is located at (x, y), and the first samples located at (2*x, 2*y) and (2*x, 2*y+1).

Solution 44A. The method of solution 41A, where a number of the first samples is based on a coordinate of the second sample.

Solution 45A. The method of solution 41A, where relationships between parameters are predefined.

Solution 46A. The method of solution 41A, where relationships between parameters include two or more relationships that are predefined.

Solution 47A. The method of solution 46A, where the a first relationship of the relationships is selected on a decoder-side, and the selection is indicated from an encoder-side to the decoder-side in a VPS, a SPS, a PPS, a slice header, a tile group, a tile, a CTU row, a CTU, a CU, or a prediction unit (PU).

Solution 48A. A method for processing video comprises using, by a processor, a first video block related to a first color component to generate a prediction block for a second video block related to a second color component, the first color component and the second color component being different color components; and generating the second video block related to the second color component using the prediction block.

Solution 49A. A method of video processing comprises performing a conversion between a video block and a bitstream representation of the video block using a two-step inter-component prediction coding tool in which reconstructed samples of a first component of the video block are used to derive a prediction block for a second component of the video block using a linear model, where a mode of the two-step inter-component prediction coding tool defines that: (a) the linear model is one of multiple allowed linear models for the conversion, or (b) a resampling method used for derivation of the prediction block is one of multiple allowed resampling methods during conversion, or (c) a position of the reconstructed of the first component is one of multiple allowed positions for the first component during the conversion, where the conversion includes (1) generating pixels values of the video block from the bitstream or (2) generating the bitstream from the video block.

Solution 50A. The method of solution 49A, where the allowed position includes neighboring samples from above row or a right above row of the video block.

Solution 51A. The method of solution 49A, where the allowed position includes neighboring samples from a left column or a left below column of the video block.

Solution 52A. The method of any of solutions 49A-51A where different portions of the current block use different linear models for the two-step inter component prediction tool.

Solution 53A. The method of any of solutions 49A-52A where the resampling includes one of downsampling or upsampling.

Solution 54A. The method of solution 53A, where the first component is a chroma component and the second component is a luma component and where a chroma sample at location (x, y) is derived from a corresponding luma reconstructed sample at positions including one or more of (2*x−1, 2*y), (2*x−1, 2*y+1), (2*x, 2*y), (2*x, 2*y+1), (2*x+1, 2*y) or (2*x+1, 2*y+1), where x and y are integers.

Solution 55A. The method of any of solutions 49A-54A, where the mode is indicated in the bitstream using a flag that indicates that the two-step inter-component coding tool is used for the conversion.

Solution 56A. The method of any of solutions 49A-54A, where the mode is indicated in the bitstream using a codeword that is shorter than other coding modes signaled in the bitstream.

Solution 57A. The method of any of solutions 49A-55A, where the mode is one of three possible modes in the bitstream and where the three possible modes are assigned codewords that are longer than DM mode and shorter than other chroma modes allowed in the bitstream.

Solution 58A. The method of any of solutions 49A-53A where the first component and the second component are two chroma components of the video block.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any

| Mode | Bin String |
| --- | --- |
| Mode0 | 1 |
| Mode1 | 01 |
| Mode2 | 001 |
| ... | |
| Mode(M-1) | 00 . . . 000. |

The invention claimed is:

1. A method of video processing, comprising:
generating a prediction block for a chroma block of a current video block of a video, wherein the prediction block is selectively generated according to a criterion by applying a first prediction mode; and
performing a conversion between the current video block and a bitstream of the video based on the prediction block, wherein a first field in the bitstream indicates whether the first prediction mode is utilized, and the bitstream includes a second field which indicates which mode from multiple modes in the first prediction mode is selected;
wherein in the first prediction mode, the prediction block is derived based on a temporary video block, and the temporary video block is derived from a reconstructed luma block of the current video block.

2. The method of claim 1, wherein the bitstream includes a shortest codeword that is assigned to a direct mode (DM) followed by the first field that indicates whether the first prediction mode is utilized.

3. The method of claim 1, wherein the multiple modes are associated with shorter codewords compared to intra chroma modes other than direct mode (DM).

4. The method of claim 3, wherein a codeword for the DM is shorter than a multiple codewords for the multiple modes.

5. The method of claim 1, wherein the first prediction mode is selected from Mode0, Mode1 and Mode2 according to how neighboring samples are utilized.

6. The method of claim 5,
wherein the Mode0 indicates to use both left and above neighboring samples to derive linear model parameters, or
wherein the Mode1 and Mode2 respectively indicate to use only left and only above neighboring samples to derive linear model parameters.

7. The method of claim 1, wherein a selected mode from the multiple modes is signaled followed by indications of the multiple modes, and wherein binarization of intra chroma modes is defined as shown below:

8. The method of claim 1, wherein the multiple modes are allowed with different linear model parameter derivation methods in the first prediction mode.

9. The method of claim 1,
wherein the temporary video block is associated with a first set of samples and the reconstructed luma block is associated with a second set of samples,
wherein at least one sample $S_{Temp}(x0, y0)$ in the first set of samples is derived as a first function of a corresponding sample $S(x0,y0)$ from the second set of samples,
wherein x0 is within a first range of zero to (M'−1), inclusive, and y0 is within a second range of zero to (N'−1), inclusive, and
wherein M' represents a width of the first size, and N' represents a height of the second size.

10. The method of claim 9, wherein in the first function, $S_{Temp}(x0, y0)$ is defined as $((S (x0, y0)*a)>>k)+b$.

11. The method of claim 1, wherein the bitstream includes a first bin indicating usage of a direct mode (DM), and wherein the first bin is context coded.

12. The method of claim 11, wherein a second bin indicating usage of the first prediction mode follows the first bin.

13. The method of claim 11, wherein the first bin is context coded using a single context.

14. The method of claim 12, wherein the second bin is context coded.

15. The method of claim 14, wherein the second bin is context coded using a single context.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:
generate a prediction block for a chroma block of a current video block of a video, wherein the prediction block is selectively generated according to a criterion by applying a first prediction mode; and
perform a conversion between the current video block and a bitstream of the video based on the prediction block, wherein a first field in the bitstream indicates whether the first prediction mode is utilized, and the bitstream includes a second field which indicates which mode from multiple modes in the first prediction mode is selected;
wherein in the first prediction mode, the prediction block is derived based on a temporary video block, and the temporary video block is derived from a reconstructed luma block of the current video block.

19. A non-transitory computer-readable storage medium storing instructions that cause a processor to:
generate a prediction block for a chroma block of a current video block of a video, wherein the prediction block is selectively generated according to a criterion by applying a first prediction mode; and perform a conversion between the current video block and a bitstream of the video based on the prediction block, wherein a first field in the bitstream indicates whether the first prediction mode is utilized, and the bitstream includes a second field which indicates which mode from multiple modes in the first prediction mode is selected;

wherein in the first prediction mode, the prediction block is derived based on a temporary video block, and the temporary video block is derived from a reconstructed luma block of the current video block.

20. A non-transitory computer-readable recording medium storing a bitstream of a video which is generated by a method performed by a video processing apparatus, wherein the method comprises:

generating a prediction block for a chroma block of a current video block of a video, wherein the prediction block is selectively generated according to a criterion by applying a first prediction mode; and generating the bitstream based on the prediction block, wherein a first field in the bitstream indicates whether the first prediction mode is utilized, and the bitstream includes a second field which indicates which mode from multiple modes in the first prediction mode is selected;

wherein in the first prediction mode, the prediction block is derived based on a temporary video block, and the temporary video block is derived from a reconstructed luma block of the current video block.

* * * * *